United States Patent [19]

Takeuchi et al.

[11] Patent Number: 4,829,889
[45] Date of Patent: May 16, 1989

[54] DISPENSER

[75] Inventors: Hirosato Takeuchi; Akira Takanaka; Masanori Nishikiori; Nobuyuki Nozawa; Toshio Sato, all of Tokyo, Japan

[73] Assignees: Nitto Kohki Co., Ltd.; Key Coffee Co., Ltd., both of Tokyo, Japan

[21] Appl. No.: 199,786

[22] Filed: May 27, 1988

[30] Foreign Application Priority Data

May 30, 1987 [JP] Japan .................................. 62-135625
Aug. 27, 1987 [JP] Japan ............................. 62-129145[U]
Dec. 16, 1987 [JP] Japan ............................. 62-190810[U]

[51] Int. Cl.⁴ .............................................. A47J 31/34
[52] U.S. Cl. .................................... 99/289 P; 99/285; 99/302 R
[58] Field of Search ...................... 99/279, 285, 289 R, 99/289 T, 289 D, 289 P, 292, 294, 295, 297, 299, 300, 302 R; 426/433

[56] References Cited

U.S. PATENT DOCUMENTS

| 2,899,885 | 8/1959 | Thompson . | |
|---|---|---|---|
| 2,952,202 | 9/1960 | Renner et al. . | |
| 3,055,286 | 9/1962 | Valente | 99/289 P |
| 3,327,615 | 6/1967 | Swan . | |
| 4,253,385 | 3/1981 | Illy . | |
| 4,357,861 | 11/1982 | Girolamo | 99/289 R |
| 4,389,925 | 6/1983 | Piana . | |
| 4,418,614 | 12/1983 | Oota et al. . | |
| 4,421,014 | 12/1983 | Vicker | 99/289 P |
| 4,426,919 | 1/1984 | Rhoten . | |
| 4,506,596 | 3/1985 | Shigenobu et al. . | |
| 4,602,558 | 7/1986 | Kaper | 99/289 R |

FOREIGN PATENT DOCUMENTS 235134 8/1961 Australia .
254812 10/1964 Australia .

Primary Examiner—Robert W. Jenkins
Attorney, Agent, or Firm—Nixon & Vanderhye

[57] ABSTRACT

A dispenser includes a cartridge moving mechanism and a hopper. The cartridge moving mechanism moves between a cartridge receiving position and an extracting position and between the extracting position and a cartridge exhaust position. The hopper has a dropping unit and is disposed immediately above the cartridge receiving position. The dropping unit serves to drop a cartridge consisting of a fluid-impermeable outer frame and a filters. A space defined between the filters and the outer frame and contains a powdery or granular material to be extracted. An extracting mechanism of the dispenser has an upper extracting head, and a lower extracting head including an extracting tank. The upper extracting head is provided above the extracting position and has an extracting chamber. The extracting tank is provided below the extracting position to face the upper extracting head, and another extracting chamber is formed in the extracting tank. The lower extracting head has a heater for heating the extracting tank and a liquid heating passage communicating with the extracting chamber. The dispenser effectively obtains an extract from the material of the cartridge by dripping.

21 Claims, 23 Drawing Sheets

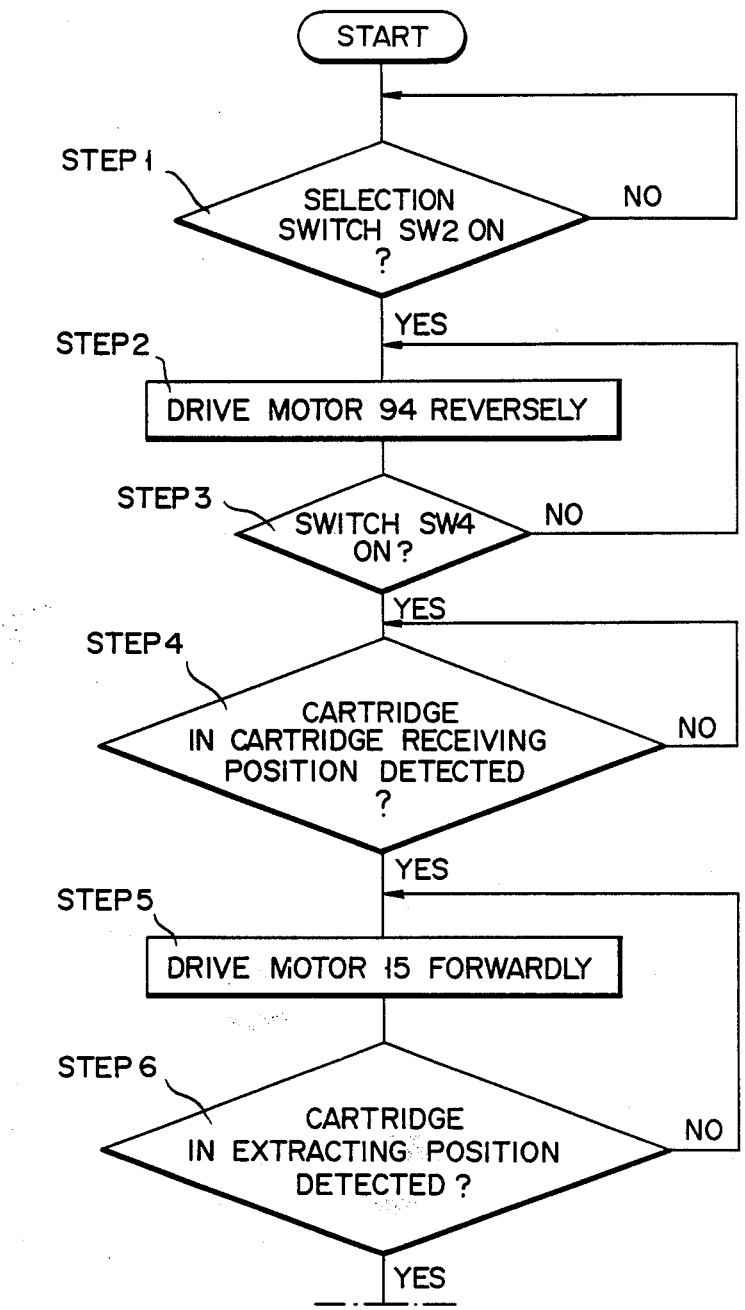
F I G. 16A

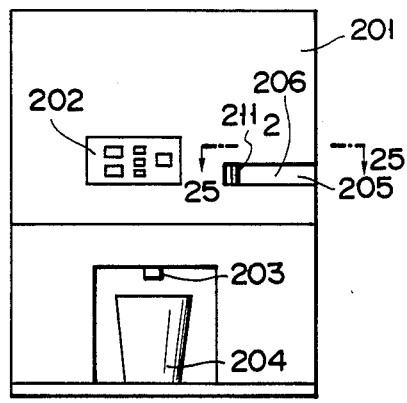
F I G. 24
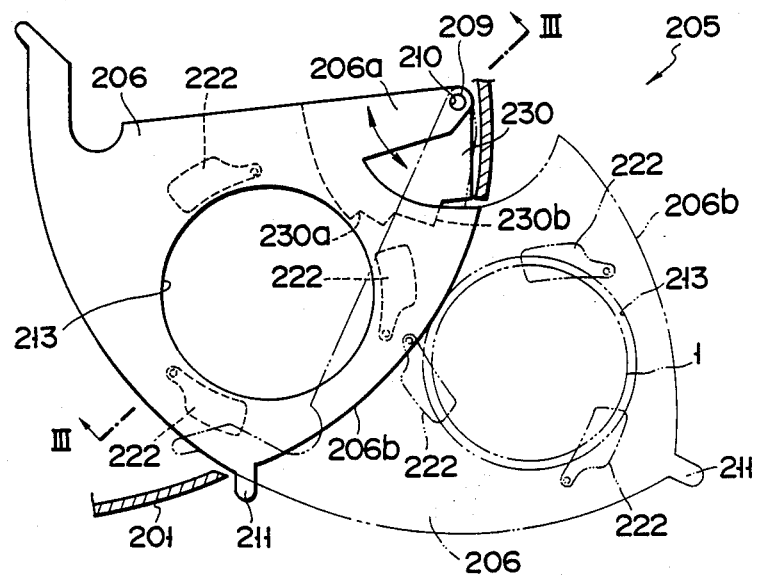
F I G. 25

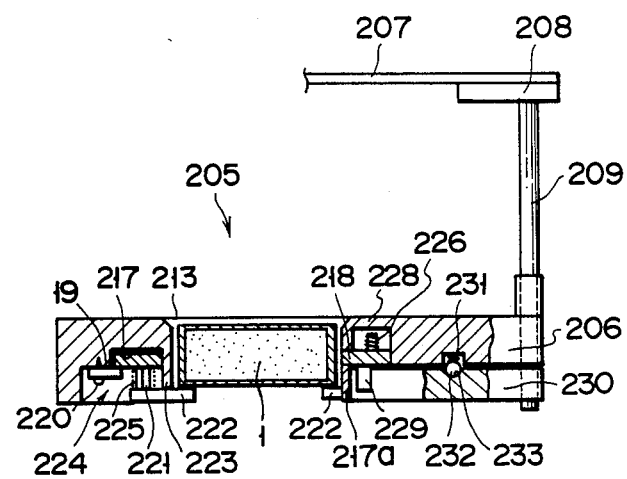
F I G. 26
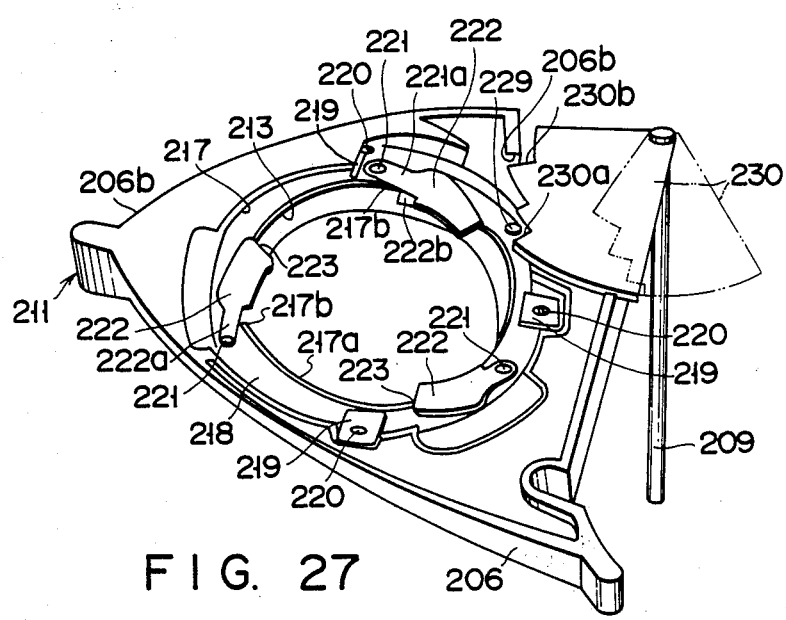
F I G. 27

DISPENSER

BACKGROUND OF THE INVENTION

1. Field of the Invention

The present invention relates to a dispenser for extracting a liquid extract from a powdered material such as coffee, powdered black tea, powdered green tea, and the like.

2. Description of the Related Art

Along with the recent spread of automatic vending machines, dispensers for easily extracting coffee and the like have become popular. In a conventional dispenser such as a known drip type coffee extracting machine, a large amount of coffee and hot water are separately stored in a storage tank. When extraction is to be performed, the coffee is measured and brought onto a filter. About one cup of hot water is supplied from the storage tank and poured onto the coffee, and coffee is extracted by dripping. After coffee is extracted, the residue is automatically thrown away together with the filter.

As described above, many conventional dispensers employ drip extraction. However, such a conventional dispenser has the problems as follows.

Since coffee is stored as it is, it is difficult to handle it during maintenance. It takes time to feed and measure the coffee for extraction. Disposal of the residue is inconvenient. When a large amount of coffee is stored in the storage tank, the coffee can be easily oxidized, resulting in poor taste. From a mechanical point of view, the conventional dispenser cannot be made compact for various reasons and has a complex mechanism. Therefore, it is difficult to decrease the manufacturing cost. With a dispenser using a vacuum pump, the mechanism is further complicated. Moreover, when the dispenser employs an automatic drip extracting method, the coffee extracting efficiency is poor. Therefore, in order to obtain strong coffee, a large amount of coffee must be used and is thus uneconomical. A siphon extraction type dispenser is not currently available since it is expensive. With the conventional extracting method, high-quality coffee satisfying the consumers' taste cannot be obtained.

SUMMARY OF THE INVENTION

It is a object of the present invention to provide a dispenser with a cartridge containing a powdered material such as coffee, in which oxidation of a source material is greatly suppressed, an extract such as liquid coffee can be efficiently obtained within a short period of time with only a small amount of the source material, and the entire mechanism is simplified and made compact, and which can be operated easily and reliably and requires easy maintenance and inspection. In order to achieve the above object, the dispenser according to the present invention comprises:

a. a cartridge moving mechanism moving between a cartridge receiving position and an extracting position, and between the extracting position and a cartridge exhaust position, these positions being provided in a horizontal plane;

b. a hopper arranged immediately above the cartridge receiving position and having a dropping unit for dropping a cartridge, the cartridge comprising a liquid-impermeable outer frame and a filter provided in the outer frame and containing a powdery or granular material; and c. an extracting mechanism comprising an upper extracting head provided above the extracting position and having a first extracting chamber, and a lower extracting head having an extracting tank provided below the extracting position so as to face the upper extracting head and having a second extracting chamber formed therein, a heating unit for heating the extracting tank and a liquid heating passage communicating with the second extracting chamber.

The dispenser according to the present invention can have a drive mechanism for sequentially moving the cartridge moving mechanism from the cartridge receiving position to the extracting position and then to the cartridge exhaust position and for holding the cartridge moving mechanism at least at the extracting position for a predetermined period of time.

A drive unit can be provided for enabling the upper and lower extracting heads to approach each other and separate from each other such that when these heads approach each other, a cartridge that has been transferred to the extracting position is clamped between the two heads.

A liquid metering mechanism can be connected to the liquid heating passage of the lower extracting head, for metering and storing a predetermined amount of liquid in a metering tank and for supplying the liquid to the second extracting chamber.

BRIEF DESCRIPTION OF THE DRAWINGS

This invention can be fully understood from the following detailed description with reference to the accompanying drawings in which:

FIGS. 16A to 16C are flow charts of the embodiment shown in FIG. 15

FIG. 24 is a front view of a dispenser according to another embodiment of the present invention;

FIG. 25 is a plan view of an embodiment of a moving mechanism used in the dispenser shown in FIG. 24;

FIG. 26 is a longitudinal sectional view of FIG. 25;

FIG. 27 is a perspective bottom view of the moving mechanism shown in FIG. 25;

DETAILED DESCRIPTION OF THE PREFERRED EMBODIMENTS

Figure 1:
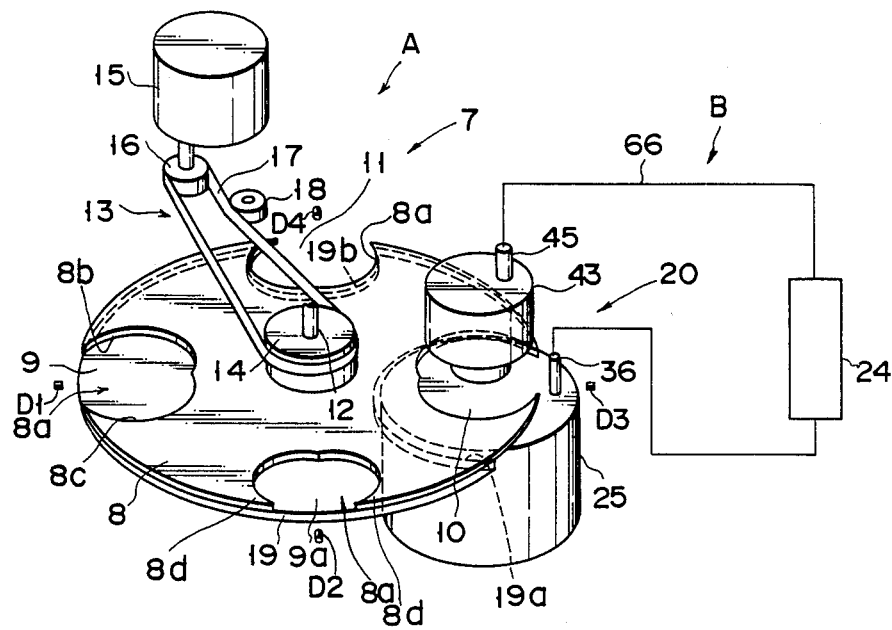
FIG. 1 is a perspective view of a main portion of a dispenser according to an embodiment of the present invention.

FIG. 1 shows an overall arrangement of a first embodiment of the present invention.

The dispenser according to the present invention comprises supply system A for moving cartridge 1 or 1a containing material 5 to be extracted to be described below to a plurality of positions and extracting system B for extracting an extract such as liquid coffee from powdery or granular material 5 such as coffee in cartridge 1 or 1a.

Figure 2:
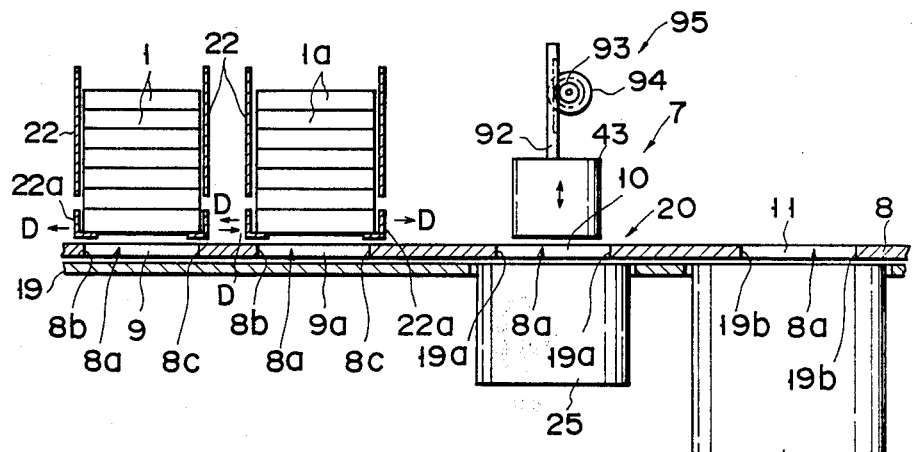
FIG. 2 is an extended sectional view of the dispenser shown in FIG. 1 taken along a central portion of the cartridge holding portion.

Referring to FIG. 2, supply system A mainly has hoppers 22 for storing stacked source material cartridges 1 or 1a, cartridge moving mechanism 7 for intermittently and horizontally moving cartridges 1 received one by one from corresponding hopper 22 to a predetermined position, and waste box 21 for receiving used cartridge 1.

Figure 3:
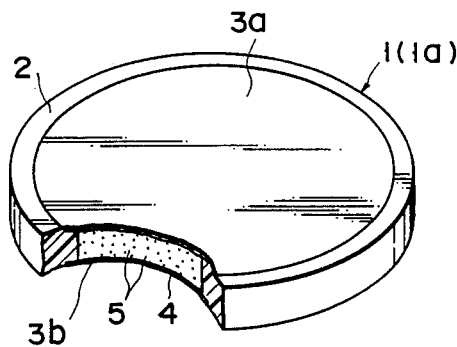
FIG. 3 is a partially cutaway perspective view of an embodiment of a cartridge used in the present invention.
Figure 4:
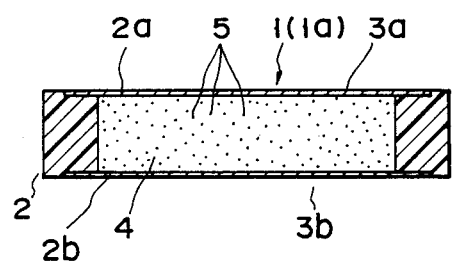
FIG. 4 is a longitudinal sectional view of the cartridge shown in FIG. 3.

FIGS. 3 and 4 show cartridge 1 or 1a.

Medium-ground coffee 5 as a source material is filled in space 4 inside rigid plastic frame (liquid-impermeable outer frame) 2. Upper and lower ends 2a and 2b of frame 2 are sealed by filters 3a and 3b made of a material having filtering characteristics such as nonwoven fabric, filtering cloth, filtering paper, or the like. Although frame 2 can be polygonal, it is usually annular so that its peripheries are reliably sealed.

Figure 5:
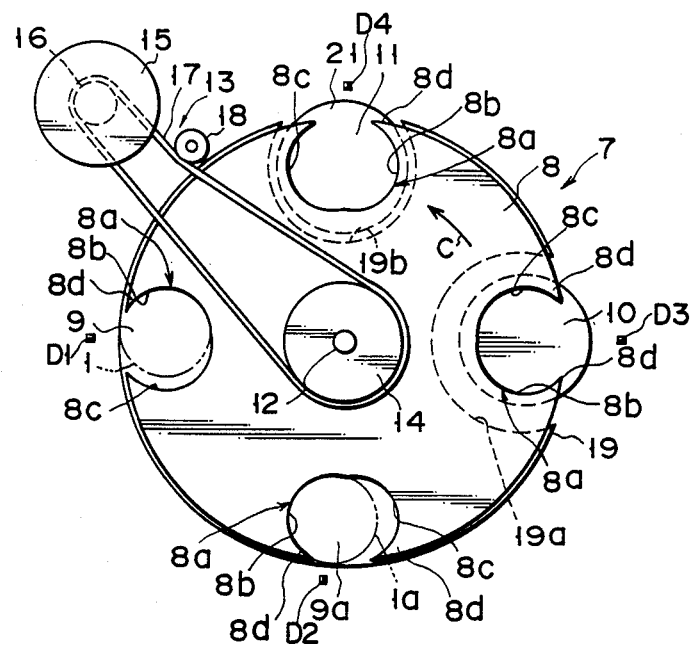
FIG. 5 is a plan view of the main portion of the dispenser shown in FIG. 1.

FIG. 5 shows cartridge moving mechanism 7 which has horizontal rotary disc 8 rotatable around support shaft 12 in a direction indicated by arrow C. The periphery of rotary disc 8 is notched at several portions to form a plurality of (4 in this embodiment) cartridge holding portions 8a. Cartridge holding portions 9a are arranged at equal intervals in the circumferential direction of disc 8. Therefore, when two adjacent holding portions 8a out of four are vertically aligned with the respective two cartridge receiving positions 9 and 9a of cartridge support disc 19 to be described later, the remaining two holding portions 8a are aligned with corresponding extracting and cartridge exhaust positions 10 and 11 (FIG. 1).

A portion of the inner ridge of each cartridge holding portion 8a opposite to rotating direction C of rotary disc 8 serves as cartridge seizing portion 8b having a shape complementary to the outer ridge of cartridge 1 or 1a. In this embodiment, seizing portion 8b is arcuated to have a radius of curvature substantially same as that of cartridge 1 or 1a.

A portion of the inner ridge of cartridge holding portion 8a which is on the side of rotating direction C of rotary disc 8 and facing seizing portion 8b serves as guide portion 8c having a shape complementary to the outer ridge of cartridge 1 or 1a. The maximum distance between seizing portion 8b and opposing guide portion 8c is slightly larger than the diameter of cartridge 1 or 1a. Since holding portion 8a has a cocoon-like or elliptic shape in the circumferential direction of rotary disc 8, it can easily receive cartridge 1 or 1a. The periphery of disc 8, seizing portion 8b, and guide portion 8c define substantially triangular retaining portions 8d extending towards each other. Retaining portions 8d serve to prevent cartridge 1 or 1a from popping outward as a result of the centrifugal force produced when disc 8 is intermittently rotated.

Referring to FIGS. 1, 2, and 5, rotary disc 8 repeats intermittent rotation in the direction of arrow C and is stopped by disc drive mechanism 13 for a predetermined period of time when cartridge holding portion 8a has reached cartridge receiving position 9 or 9a, extracting position 10, or cartridge exhaust position 11. Although disc drive mechanism 13 can have a gear, belt, chain, or other transmission mechanism, a belt transmission mechanism is used in this embodiment. More specifically, endless belt 17 is extended between driven pulley 14 fixed on support shaft 12 and drive pulley 16 fixed to the output shaft of electric motor 15. Tension roller 18 urges belt 17 so that belt 17 is stretched.

Stationary cartridge support disc 19 is provided in parallel to rotary disc 8 thereunder. Support disc 19 has a diameter substantially same as or slightly larger than that of disc 8 and is formed with circular notches 19a and 19b at the portions just above extracting and cartridge exhaust positions 10 and 11.

Cylindrical hollow hoppers 22 each having upper and lower open ends and containing stacked source material cartridges 1 and 1a are provided above cartridge receiving positions 9 and 9a. When cartridge holding portion 8a is located above cartridge receiving position 9 or 9a, extracting position 10, or cartridge exhaust position 11, cartridge 1 or 1a at a lowest position in either one of corresponding hoppers 22 falls on the upper surface of cartridge support disc 19 from the lower end of hopper 22. Above other positions than position 9, 9a, 10, or 11, each hopper 22 is closed with holding member 22a provided at its lower end and holds cartridges 1 or 1a.

Extracting system B has extracting mechanism 20 whose main portion of extracting mechanism 20 is located at extracting position 10 and which has an arrangement as follows.

As shown in FIG. 1, upper extracting head 43 is vertically movable immediately above extracting position 10. Lower extracting head 25 is provided immediately under head 43 with rotary disc 8 interposed therebetween. When cartridge 1 or 1a has reached an extracting position, it is located between heads 43 and 25.

Waste box 21 is provided immediately under cartridge exhaust position 11 (FIG. 2).

In this embodiment, two cartridge receiving positions are provided. Therefore, a cartridge for weak or so-called American type coffee (to be referred to as "American coffee" hereinafter) can be received at one of the cartridge receiving positions while a cartridge for strong or so-called European type coffee (to be referred to as "regular coffee" hereinafter) can be received at the other position. As a result, a user can select a favorite type of coffee from a single dispenser.

Extracting system B further has liquid metering mechanism 23 (FIG. 9) for metering and supplying water used for extraction and pressurizing mechanism 24 for selectively supplying water and air to extracting mechanism 20 under pressure and subsequently exhausting them from mechanism 20 (FIG. 1).

Figure 7:
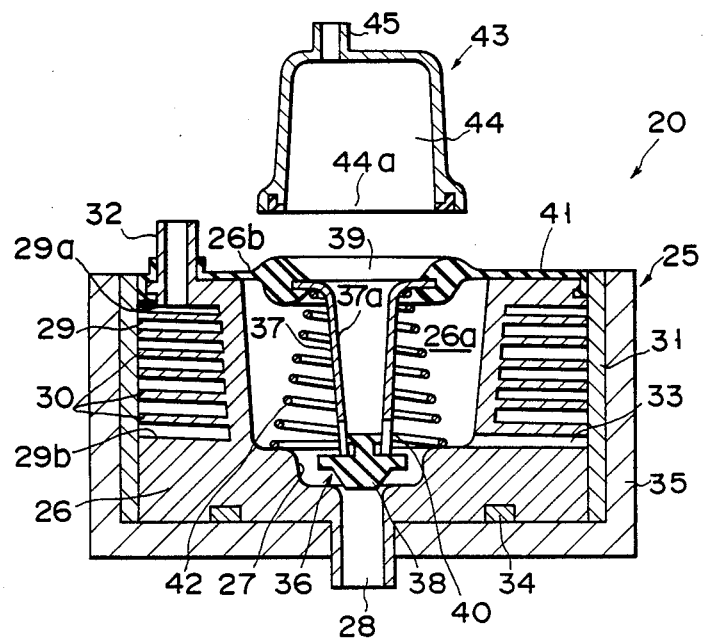
FIGS. 7 and 8 are longitudinal sectional views of an embodiment of an extracting mechanism when it is opened and closed, respectively.
Figure 8:
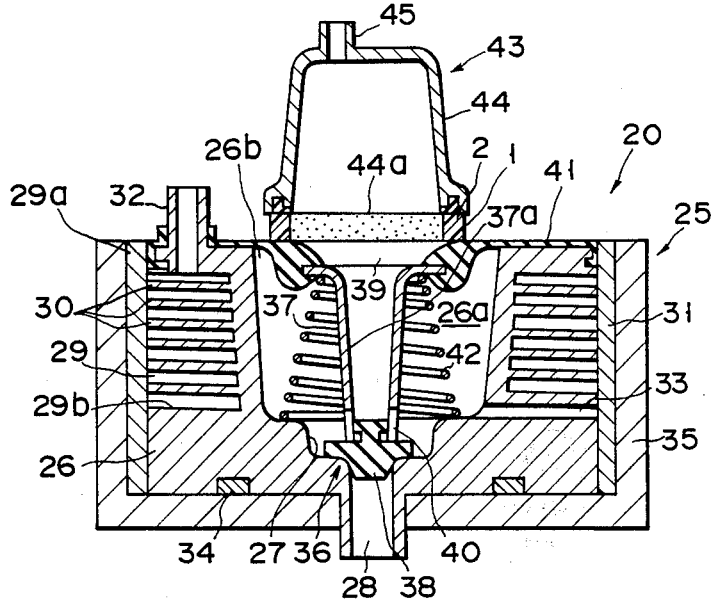

Referring to FIGS. 7 and 8, lower extracting head 25 has a bottom and cylindrical hollow extracting tank 26 made of a heat-conductive material such as a metal. Tank 26 has extracting chamber 26a having upper open end 26b. Recess 27 is formed in the central portion of the bottom of tank 26. Extracted liquid exhaust port 28 extends downward from recess 27 to exhaust the liquid in tank 26 to the outside thereof.

Heating fin 30 is spirally formed to surround extracting tank 26. Tank 26 is fitted in metal protection cylinder 31 such that the outer surface of fin 30 is in close contact with the inner surface of metal protection cylinder 31. The surfaces of fin 30 and cylinder 31 define spiral liquid heating passage 29.

Upstream end 29a of liquid heating passage 29 is connected to flow-in cylinder 32 formed at the upper end of extracting tank 26. A fluid such as water or air is introduced into heating passage 29 through cylinder 32. Downstream end 29b of heating passage 29 communicates with extracting chamber 26a through communication hole 33 which is formed at a side of the central portion of tank 26 and opened at the lower inner wall of chamber 26a. Air and liquid are selectively introduced from heating passage 29 to the interior of chamber 26a through hole 33. Power source 34 is housed in tank 26 at, e.g., its bottom. Power source 34 heats the air and water flowing through heating passage 29 and fin 30 to a required temperature. Lower extracting head 25, protection cylinder 31, and power source 34 are housed in heat-insulating casing 35.

Valve mechanism 36 is mounted in lower extracting head 25 and comprises reverse funnel portion 37 in extracting tank 26, and valve 38, fixed on the lower end of funnel 37, for opening and closing extracted liquid exhaust port 28.

Funnel 37 has rigid main body 37a and flange 41 which is provided above main body 37a and made of an elastic material such as a rubber or plastic. Funnel 37 has upper outlet/inlet 39 at its upper end. Flange 41 seals opening 26b in a liquid-tight manner. A plurality of communication holes or slits 40 are formed in the lower end portion of funnel 37 to introduce hot water in extracting chamber 26a into funnel 37. Since flange 41 is flexible, funnel 37 and valve 38 are integrally movable in the directions to selectively open and close valve 38, i.e., in the vertical directions.

Conical coil spring 42 is provided between the inner ridge of flange 41 and the inner bottom surface of extracting tank 26 to normally urge funnel 37 and valve 38 upward so that valve 38 is opened at extracted liquid exhaust port 28. Upper extracting head 43 provided immediately above lower extracting head 25 to be vertically movable comprises extracting chamber 44 having lower opening 44a opposing upper outlet/inlet 39 of funnel 37. Air hole 45 is formed in the ceiling of chamber 44 to enable the interior of chamber 44 to communicate with the atmosphere and air pressurizing mechanism 24.

Cartridge 1 or 1a, which has been transferred to a position between lower and upper extracting heads 25 and 43 (i.e., to the extracting position) by cartridge moving mechanism 7, covers the upper surface of funnel 37 and is sealed between heads 25 and 43 when head 43 is moved downward (FIG. 8). Head 43 is vertically moved via, e.g., rack 92 provided on the upper end of head 43, pinion 93 engaged with rack 92 and drive means 95 comprising electric motor 94 to rotate pinion 93 (FIG. 2).

Figure 9:
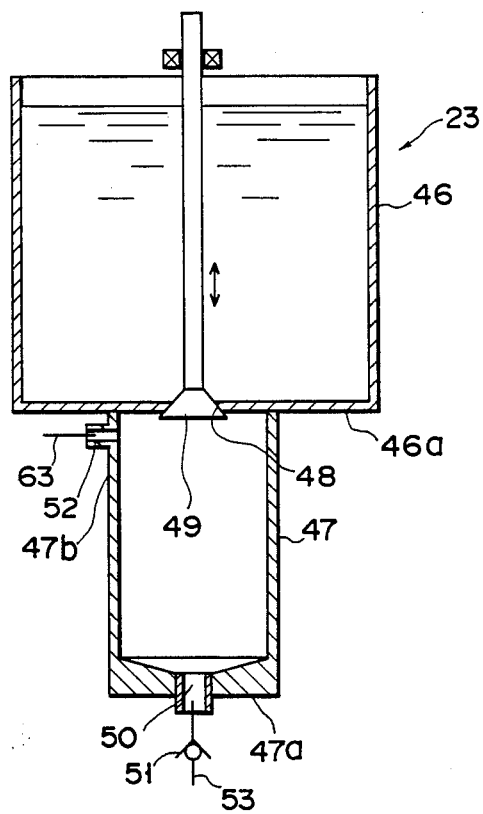
FIG. 9 is a longitudinal sectional view of an embodiment of a liquid metering mechanism.

Liquid metering mechanism 23 has storage tank 46 for storing a large amount of water and metering tank 47, provided under tank 46, for metering one cup of water, as shown in FIG. 9. Bottom plate 46a of tank 46 also serves as an upper wall of tank 47.

Liquid outlet ports 48 and 50 are formed in the central portions of bottom plates 46a and 47a of tanks 46 and 47, respectively. Solenoid operated opening valve 49 is provided in outlet port 48 to be vertically moved by solenoid 49a. Liquid outlet port 50 is connected to gas/liquid flow path 53 in which check valve 51 is provided. Pressurized air inlet port 52 is formed in upper portion 47b of the side wall of metering tank 47.

Figure 11:
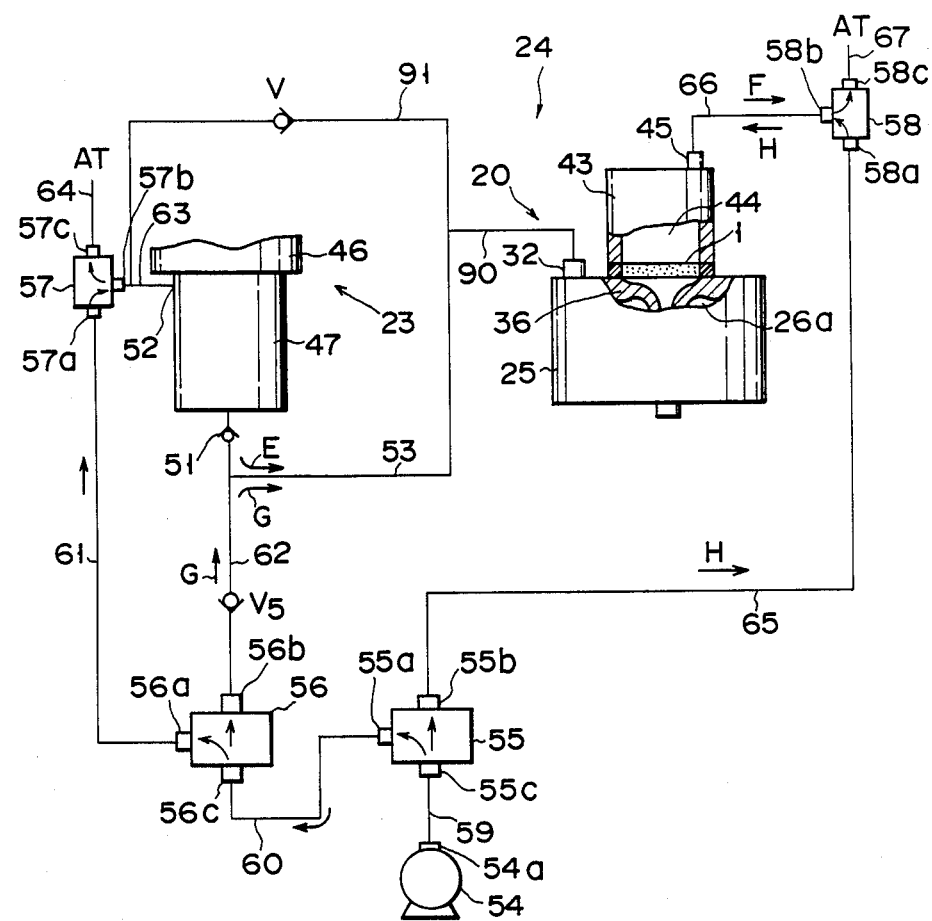
FIG. 11 is a hydraulic circuit of an embodiment of a pressurizing mechanism used in the embodiments shown in FIG. and 6.

FIG. 11 shows a hydraulic circuit having a function to supply pressurized air to extracting mechanism 20 and to supply liquid metering mechanism 23 and one cup of water metered by mechanism 23 to mechanism 20, and a function to vertically reciprocate hot water (extracted liquid) within mechanism 20 and to obtain the extracted liquid. The pressurized air is supplied from air compressor 54.

The hydraulic circuit of FIG. 11 has air flow path 53 which serves to supply metered water from metering tank 47 of liquid metering mechanism 23 to lower extracting head 25 of extracting mechanism 20. Paths 62 and 65 serve to supply the pressurized air discharged from air compressor 54 alternately to extracting heads 25 and 43 so as to reciprocate the hot water (extracted liquid) between lower and upper extracting heads 25 and 43. Two forced drive three-way valves 55 and 56 for switching between gas and liquid and two balance three-way valves 57 and 58 are provided. These valves 55, 56, 57, and 58, extracting mechanism 20, metering tank 47, and air compressor 54 are connected to each other via air flow paths 59, 60, 61, 63, 64, 65, 66, and 67.

The hydraulic circuit of FIG. 11 will be described in further detail. Discharge port 54a of air compressor 54 is connected to inlet port 55c of forced drive three-way valve 55 via air flow path 59. One outlet port 55a of valve 55 is connected to inlet port 56c of forced drive three-way valve 56 via air flow path 60. One outlet port 56a of three-way valve 56 is connected to inlet port 57a of balance three-way valve 57 via air flow path 61. The other outlet port 56b of valve 56 is connected to flow-in cylinder 32 of lower extracting head 25 via air flow path 62 and gas/liquid flow paths 53 and 90. Inlet/outlet port 57b of valve 57 is connected to pressurized air inlet port 52 of metering tank 47 via air flow path 65. The other outlet port 57c. of valve 57 is connected to the atmosphere AT via air flow path 64. The other outlet port 55b of valve 55 is connected to inlet port 58a of balance three-way valve 58 via air flow path 65. Inlet/outlet port 58b of valve 58 is connected to air hole 45 of upper extracting head 43 via air flow path 66, and the other outlet port 58c thereof communicates with the atmosphere AT via air flow path 67.

Figure 10:
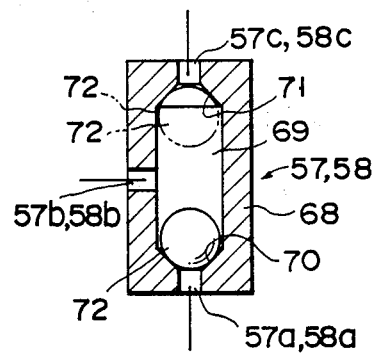
FIG. 10 is a longitudinal sectional view of an embodiment of a balance three-way valve.

Balance three-way valves 57 and 58 have an arrangement as shown in FIG. 10. Elongated valve chamber 69 extending in the vertical direction is formed in main body 68 of valve 57 or 58. Inlet port 57a or 58a is formed in the lower end portion of valve chamber 69, and outlet port 57c or 58c is formed in the upper portion of valve chamber 69. Portions continuous with port 57a or 58a and port 57c or 58c form conical valve seats 70 and 71 tapered toward the corresponding inlet and outlet ports, respectively. Inlet/outlet port 57b or 58b is formed in the side wall of valve chamber 69 located between inlet port 57a or 58a and outlet port 57c or 58c. Vertical movable ball valve 72 is housed in valve chamber 69. When ball valve 72 selectively contacts valve seat 70 or 71, inlet port 57a or 58a and outlet port 57c or 58c are selectively closed.

The operation of this embodiment will be described.

In the standby mode, cartridge holding portions 8a of rotary disc 8 of cartridge moving mechanism 7 are located to correspond to cartridge receiving positions 9 and 9a, extracting position 10, and cartridge exhaust position 11. In extracting mechanism 20, upper extracting head 43 is in the lowermost position so as to be in close contact with flange 41 of funnel 37, as shown in FIG. 8. In this state, head 43 urges funnel 37 downward to seal extracted liquid exhaust port 28 with valve 38 so that no dust enters extracting mechanism 20.

Referring to FIGS. 13 and 14A to 14C, when power source switch SW1 is turned on to enable power source P, heater 34 is heated to a predetermined temperature under the control of heater drive-temperature control circuit HTC.

Step 1

The user depresses selection switch SW2 or SW3, corresponding to regular or American coffee, in accordance with his preference.

Step 2

Upon designation by the MPU, electric motor 94 is rotated in the reverse direction through upper extracting head drive HD to move upper extracting head 43 upward.

Step 3

When the upper end of rack 92 abuts against microswitch SW4 provided at a predetermined position inside the dispenser, electric motor 94 is stopped, and extracting mechanism 20 is set in an open state.

Step 4

After step 3, receiving member 22a of regular or American coffee hopper I or II designated at 22 is moved in the direction of arrow D in FIG. 2 automatically or by the MPU. Lowest cartridge 1 in corresponding hopper I or II drops in the corresponding cartridge holding portion 8a of rotary disc 8 located at cartridge receiving position 9 or 9a. When lowest cartridge 1 has dropped, holding member 22a is closed to hold new lowest cartridge 1. Holding member 22b is selectively opened and closed by means of, e.g., a lever or cam unit. Cartridge 1 which has dropped in this manner is detected by optical or electric detector D1 or D2 provided so as to face the corresponding cartridge receiving position 9 or 9a.

Step 5

After step 3, electric motor 15 is driven by the MPU through rotary disc motor drive RD, and rotary disc 8 is rotated in the direction indicated by arrow C in FIG. 5.

Step 6

When cartridge 1 slides on cartridge support disc 19 to reach extracting position 10 while it is held in holding portion 8a, it is detected by optical or electric detector D3 provided close to extracting position 10.

Step 7

As a result of step 6, electric motor 15 is stopped through rotary disc motor drive RD and cartridge 1 or 1a is stopped at extracting position 10.

Steps 2 and 3 can be executed together with step 5 after step 4. In this case, upper extracting head 43 reaches the upper position shown in FIG. 7 during rotation of rotary disc 8, and cartridge 1 enters the space between extracting heads 25 and 43 in the lateral direction.

When cartridge 1 has reached position immediately above lower extracting head 25 and stopped above funnel 37 of valve mechanism 26, it is correctly concentrically aligned above funnel 37, since the shape of seizing portion 8b of cartridge holding portion 8a is complementary to the shape of corresponding cartridge 1.

Step 8

Subsequently, electric motor 94 is rotated in the forward direction by the MPU through upper extracting head motor drive HD, and upper extracting head 43 is moved downward, as shown in FIG. 8. Then, head 43 urges valve mechanism 36 downward via cartridge 1 against conical coil spring 42. As a result, valve 38 fixed on the lower end of funnel 37 closes extracted liquid exhaust port 28 of extracting tank 26. Meanwhile, frame 2 of cartridge 1 is clamped by the upper end of funnel 37 and the lower end face of extracting chamber 44 of head 43. As a result, heads 25 and 43 are disconnected by cartridge 1 and are sealed from the outside. Thus, preparation for extraction is completed.

Liquid metering mechanism 23 meters one cup of water during the above preparation. More specifically, referring to FIG. 9, upon energization of solenoid 49a, valve 49 is moved downward, and water filled in storage tank 46 in advance is supplied to metering tank 47 through liquid outlet port 48. As the water is supplied into tank 47, valve 49 is moved upward by the buoyancy of water. When the water in tank 47 reaches a predetermined level, valve 49 closes outlet port 48. One cup of water is thus metered.

Step 9

Solenoids SOL II and SOL III of valves 55 and 56 are turned off through corresponding drivers VDI and VDII.

Step 10

Air compressor 54 is actuated through compressor drive CD simultaneously with or immediately after step 9. Operation of air compressor 54 is maintained during a predetermined period of time until completion of extraction.

When inlet and outlet ports 55c and 55a of three-way valve 55 are connected and simultaneously inlet and outlet ports 56c and 56a of three-way valve 56 are connected (this state is called "the water supply state" of valves 55 and 56) in steps 9 and 10, upon operation of air compressor 54, compressed air is supplied in the following manner: air compressor 54—air flow path 59—inlet port 55c—interior of three-way valve 55—outlet port 55a—air flow path 60—inlet port 56c—interior of three-way valve 56—outlet port 56a—air flow path 61—port 57a—interior of three-way valve 57. When air compressor 54 is started, inlet and inlet/outlet ports 57a and 57b of valve 57 are connected, and pressurized air is supplied from port 57b to pressurized air inlet port 52 of metering tank 47 via air flow path 63

Since water in metering tank 47 is pressurized on its upper surface by the pressurized air, the water flows out from liquid outlet port 50, opens check valve 51 and flows in flow path 53 in the direction of arrow E, and flows into lower extracting head 25 from flow-in cylinder 32 through flow path 90 continuous to the lower end of flow path 53. When forced drive three-way valve 55 is in the water supply state, its outlet port 55b is closed, and the pressure of the pressurized air is not applied to balance three-way valve 58 and air flow paths 65 and 66. At this time, inlet/outlet port 58b and outlet port 58c of valve 58 communicate with each other. As will be described later, when water flows into head 25, air in head 25 passes through funnel 37 of valve mechanism 36 and cartridge 1 to reach upper extracting head 43, air communication hole 45, air flow path 66, inlet/outlet port 58b, and then the interior of valve 58, as indicated by arrow F in FIG. 11. The air is then discharged to the atmosphere AT from outlet port 58c via air flow path 67.

Water supplied to extracting tank 26 from flow-in cylinder 32 contacts radiation fin 30 heated by heater 34 and is heated instantaneously while it is filled in liquid heating path 29. The water then passes through communication hole 33 to flow into extracting chamber 26a of extracting tank 26 and is successively heated therein. As a result, the water in chamber 26a is quickly evaporated and the interior of tank 26 is instantaneously filled with high-temperature vapor. The vapor flows from chamber 26a into the interior of funnel 37 of valve mechanism 36 through communication holes 40. Then, the vapor moves in the interior of funnel 37 upward and flows into source material cartridge 1 through filter 3b to steam coffee 5 as the powdered material.

Referring to FIG. 11, the vapor in extracting tank 44 is discharged to the atmosphere AT sequentially through air hole 45, air flow path 66, balance three-way valve 58, and air flow path 67.

Step 11

After steaming with vapor is performed for a predetermined period of time, coffee extraction is started in the following manner.

Referring again to FIG. 11, solenoid SOL III of downstream forced drive three-way valve 56 is turned on while upstream forced drive three-way valve 55 is maintained the water supply state, thus allowing inlet port 56c to communicate with outlet port 56b (this state is called "an air supply state" hereinafter). Then, the pressurized air flows through forced drive three-way valves 55 and 56, air flow path 62, and gas/liquid flow paths 53 and 90 in the direction indicated by arrow G. The air then flows into extracting chamber 26a sequentially through flow-in cylinder 32, liquid heating passage 29, and communication path 33 (FIG. 8). Hot water in chamber 26 is urged by the pressurized air and flows into funnel 37 through communication hole 40. Hot water then flows in funnel 37 upward and flows into extracting chamber 44 of upper extracting head 43 from upper inlet/outlet port 39 of funnel 37 through cartridge 1. The upward travel speed and travel range of the hot water through cartridge 1 are adjusted in advance in accordance with the pressure difference between extracting chambers 26a and 44. While the hot water passes through cartridge 1, the coffee ingredient is extracted from coffee 5 in a siphon-like manner. During extraction, coffee 5 is immersed in extracted liquid, i.e., hot water.

Step 12

When a required period of time has elapsed, solenoid valve SOL II of three-way valve 55 is turned on by the MPU and its inlet and outlet ports 55b and 55c communicate with each other (this state is called "the air supply state" hereinafter). Thus, the pressurized air flows from air compressor 54 into three-way valve 58 through air flow path 59, three-way valve 55, and flow path 65, and urges ball valve 72 in valve 58 upward to close its outlet port 58c and to communicate its inlet part 58a with port 58b. As a result, extracting chamber 26a in lower extracting head 25 is connected to liquid heating passage 29, flow path 90, air flow path 91 connected to flow path 90 and air flow path 63 through check valve V, air flow path 63, three-way valve 57, and flow path 64 and then communicates with the atmosphere AT. Therefore, the pressurized air from air compressor 54 travels through flow path 59, three-way valve 55, flow path 65, three-way valve 58, and flow path 66 and flows into extracting chamber 44 of upper extracting head 43 through air hole 45.

Meanwhile, since supply of pressurized air into lower extracting head 25 through three-way valve 56 is stopped, inlet/outlet port 57b and outlet port 57c of three-way valve 57 are connected to each other, and excess vapor in head 25 escapes to the atmosphere AT through flow paths 90 and 91, valve 57, and flow path 64. As a result, the extracted liquid in chamber 44 is urged downward by the urging force of the pressurized air and passes through source material cartridge 1 again, and the active ingredient of coffee 5 in cartridge 1 is extracted as in dripping extraction. Coffee which is made stronger in this manner flows through funnel 37 downward and is returned to lower extracting chamber 26a through communication holes 40. During this operation, the air in chamber 26a is discharged to the atmosphere AT through flow paths 90 and 91 and balance three-way valve 57 and water is filled in storage tank 46.

Step 13

In order to adjust coffee extraction, control means is provided to control the speed of hot water to pass source material cartridge 1 by adjusting the amount of pressurized air supplied to lower and upper extracting chambers 26a and 44, or to control the number of times of circulation of the hot water through cartridge 1, thereby arbitrarily adjusting the contact time of hot water with source material 5.

Whether hot water is passed through source material cartridge 1 in a step-wise manner or continuously can be arbitrarily determined before extraction, when an appropriate selecting means is provided. For example, when flow of hot water is intermittently stopped during hot water flow, coffee extraction with stationary hot water and coffee extraction with moving hot water are alternately repeated to obtain a clear, tasty coffee at a high extracting efficiency.

As a typical brewing process, a case will be described when hot water is vertically reciprocated between upper and lower extracting chambers 26a and 44 several times, e.g., three times.

When step 12 is completed, it is checked by the MPU and brewing condition checking circuit BC whether the required number of times of upward and downward movement of hot water is reached.

Figure 13:
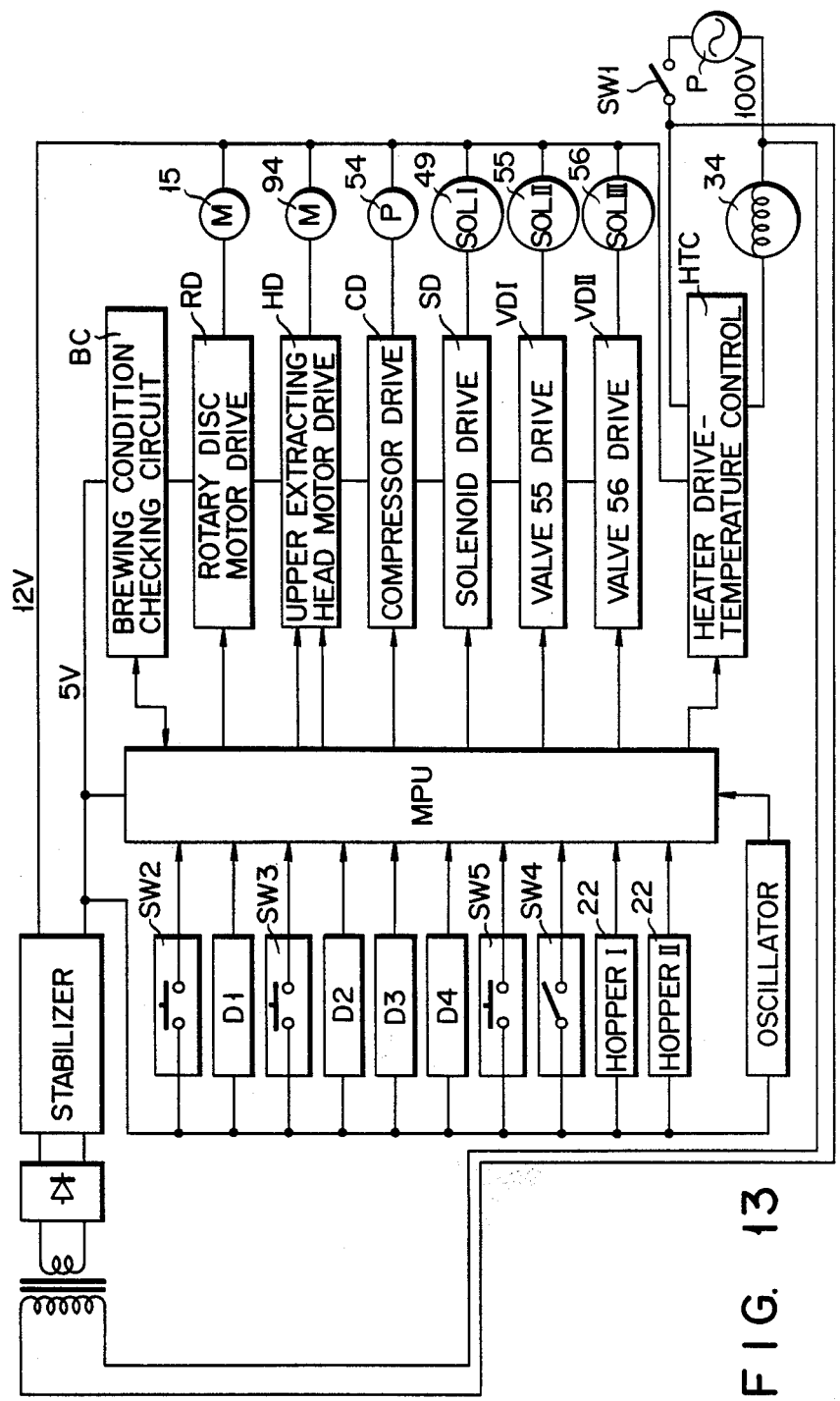
FIG. 13 is a block diagram of the embodiment shown in FIGS. 1 and 11.

If NO in step 13, the flow returns to step 9. When hot water is required to be moved upward and downward only once, step 13 is omitted, and brewing condition checking circuit BC in FIG. 13 is omitted.

Step 14

When coffee is obtained in this manner by transferring the hot water from upper chamber 44 to lower chamber 26a, solenoids SOL II and SOL III are turned off to set three-way valves 55 and 56 in the water supply state, thus supplying pressurized air from air compressor 54 to extracting tank 26.

Step 15

After step 14, the MPU rotates electric motor 94 in the reverse direction through upper extracting head motor drive HD to move upper extracting head 43 upward until it is engaged with microswitch SW4 and is stopped. As a result, the entire valve mechanism 36 is moved upward by the elastic force of conical coil spring 42 to separate valve 38 from extracted liquid exhaust port 28 of lower extracting head 25. Then, coffee is exhausted to the outer side through exhaust port 28 and is poured into a container such as a cup placed under exhaust port 28.

Step 16

When step 15 is completed, air compressor 54 is stopped.

Step 17

Electric motor 15 is turned on again, and rotary disc 8 is rotated in the direction of arrow C in FIG. 5 together with cartridge 1 or 1a containing used coffee powder.

Step 18

When cartridge 1 or 1a has reached cartridge exhaust position 11, it is detected by optical or electric detector D4 provided at position 11 to face it.

Step 19

As a result of detection by step 18, electric motor 15 is stopped and rotation of rotary disc 8 is stopped.

At this time, cartridge 1 or 1a is dropped at the cartridge exhaust position into waste box 21 below and held in it.

Step 20

After step 20, electric motor 94 is rotated in the forward direction by the MPU through upper extracting head motor drive HD to move upper extracting head 43 downward again. Thus, the lower end face of head 43 is brought into close contact with the upper end face of funnel 37 again, extracted liquid exhaust port 28 of lower extracting chamber 25 is closed by valve 38, and the flow is returned to the standby mode.

One coffee dispensing cycle is completed in this manner. In the standby mode, cartridge holding portion 8a is located at a position immediately under hopper 22.

When upper and lower extracting chambers 26a and 44 of extracting mechanism 20 are to be cleaned, water is supplied to extracting tank 26 from metering tank 47 while lower head 25 is closed with upper head 43, and hot water is vertically circulated between upper and lower chambers 26a and 44 a required number of times. Then, hot water used for cleaning is exhausted from exhaust port 28.

In order to execute cleaning, cleaning switch SW3 in FIG. 13 is turned on. Then, the flow enters step 8 in FIG. 15A, progresses until step 16, and is ended.

Figure 12:
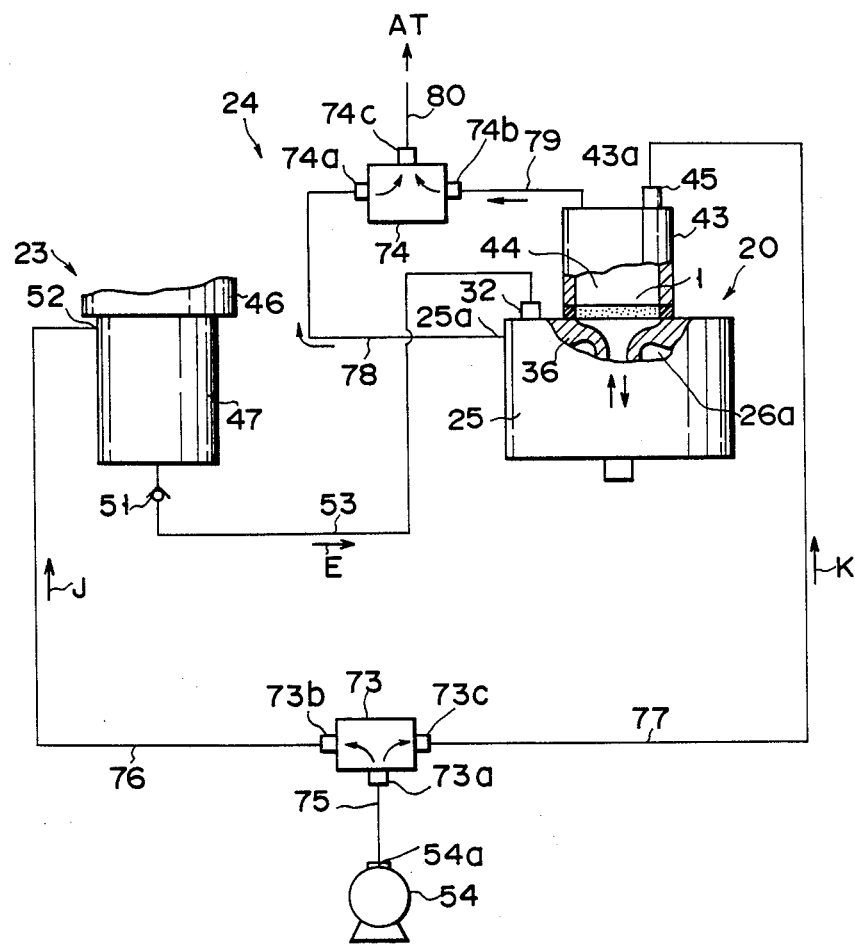
FIG. 12 is a hydraulic circuit of another embodiment of pressurizing mechanism.

FIG. 12 shows a second embodiment of extracting mechanism 20. In this embodiment, single forced drive three-way valve 74 is used in place of two balance three-way valves 57 and 58 of the first embodiment, and single forced drive three-way valve 73 is used in place of forced drive three-way valves 55 and 56 of the first embodiment. More specifically, discharge port 54a of air compressor 54 is connected to inlet port 73a of forced drive three-way valve 73 through air flow path 75. One outlet port 73b of valve 73 is connected to inlet port 52 of liquid metering tank 47 of liquid metering mechanism 23 through air flow path 76, and the other outlet port 73 thereof is connected to air hole 45 of upper extracting head 43 through air flow path 77. Air exhaust outlet ports 25a and 43a respectively communicating with extracting chambers 26a and 44 are formed in lower and upper heads 25 and 43, respectively. Outlet ports 25a and 43a communicate with inlet ports 74a and 74b of forced drive three-way valve 74 through air flow paths 78 and 79, respectively. Outlet port 74c of valve 74 is connected to the atmosphere AT through air flow path 80. The arrangement of the respective elements and portions of extracting mechanism 20 is similar to that of FIG. 11.

In this embodiment, when the water in metering tank 47 is to be supplied into lower extracting head 25 or when the hot water in extracting tank 26 is to be supplied to extracting chamber 44 of upper extracting head 43 through valve mechanism 36 and source material cartridge 1 or 1a, inlet and outlet ports 73a and 73b of forced drive three-way valve 73 communicate with each other while inlet port 73a and outlet port 73c thereof are disconnected from each other, and inlet and outlet ports 74b and 74c of forced drive three-way valve 74 communicate with each other while inlet and outlet ports 74a and 74c thereof are disconnected from each other. Then, pressurized air s supplied from air compressor 54 to metering tank 47 in the direction of arrow J in FIG. 12 through valve 73 and flow path 76. As a result, water is supplied from tank 47 into lower extracting head 25 through flow path 53, in the same manner as in the first embodiment, vapor is formed in head 25, hot water is transferred from chamber 26a to chamber 44, and air in chamber 44 is exhausted.

On the contrary, when the hot water in upper extracting head 43 is to be transferred to extracting chamber 26a of lower extracting head 25, forced drive three-way valves 73 and 74 are switched such that inlet and outlet ports 73a and 73b of forced drive three-way valve 73 are closed to communicate its inlet port 73a with outlet port 73c and that inlet and outlet ports 74b and 74c of forced drive three-way valve 74 are closed to communicate with its inlet port 74a with outlet port 74c. Then, pressurized air is supplied from air compressor 54 in the direction of arrow K through flow path 77, the extracted liquid flows downward in extracting mechanism 20, and air in extracting chamber 26 is exhausted to the atmosphere AT through flow path 78, valve 74, and flow path 80.

Figure 14A:
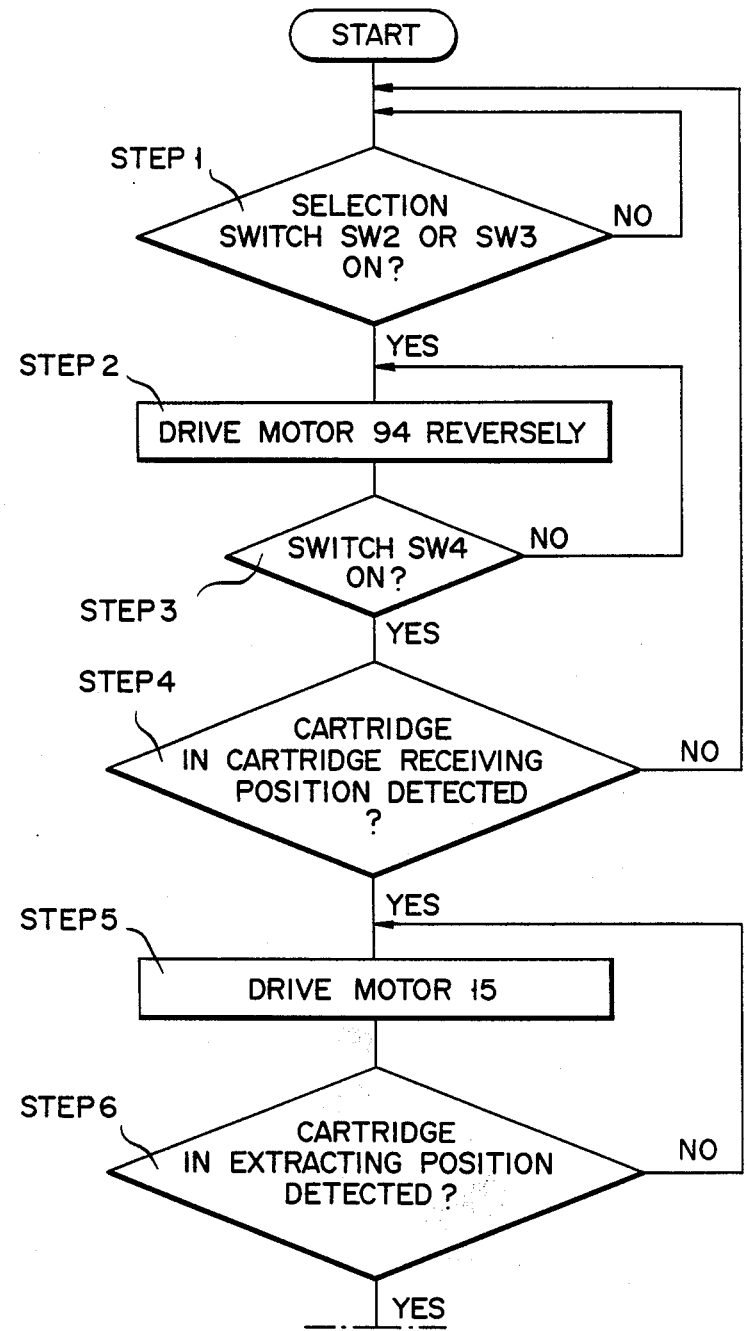
FIGS. 14A to 14C are flow charts of the embodiment shown in FIG. 13.
Figure 14B:
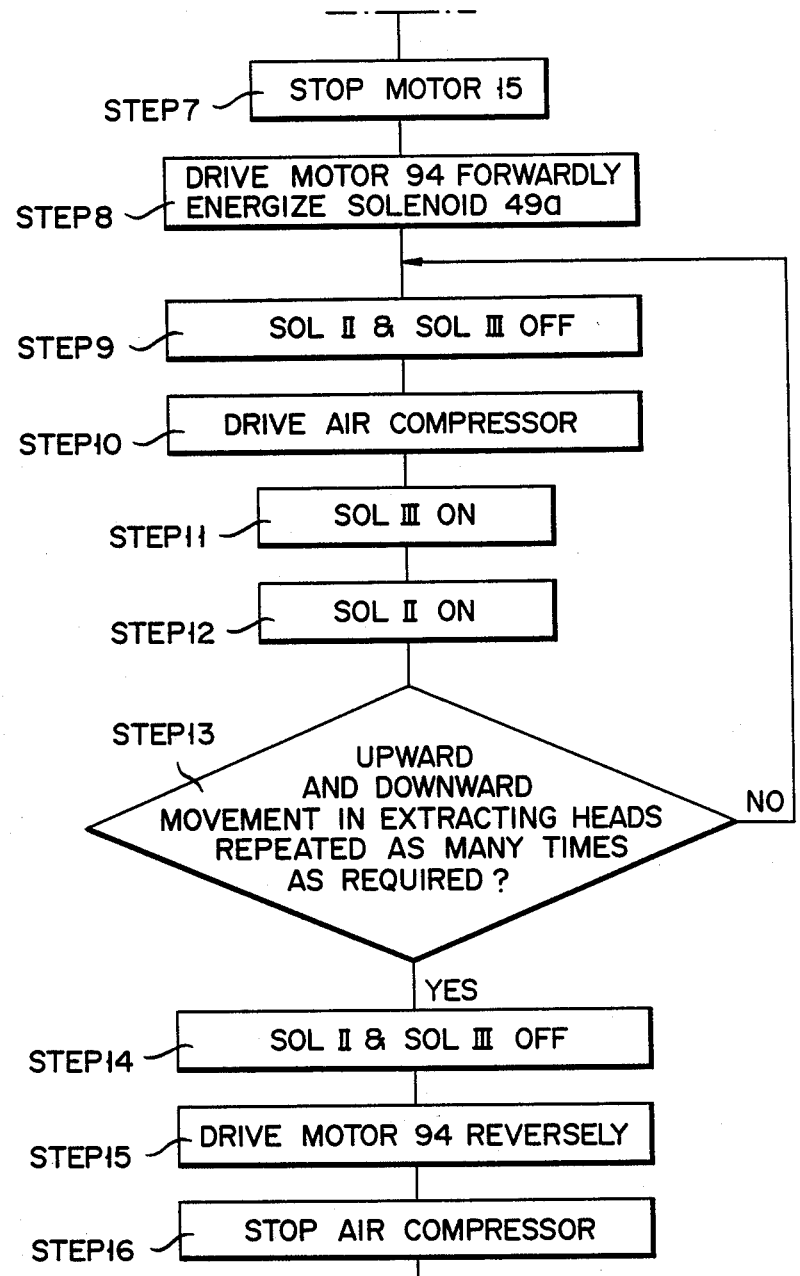
Figure 14C:
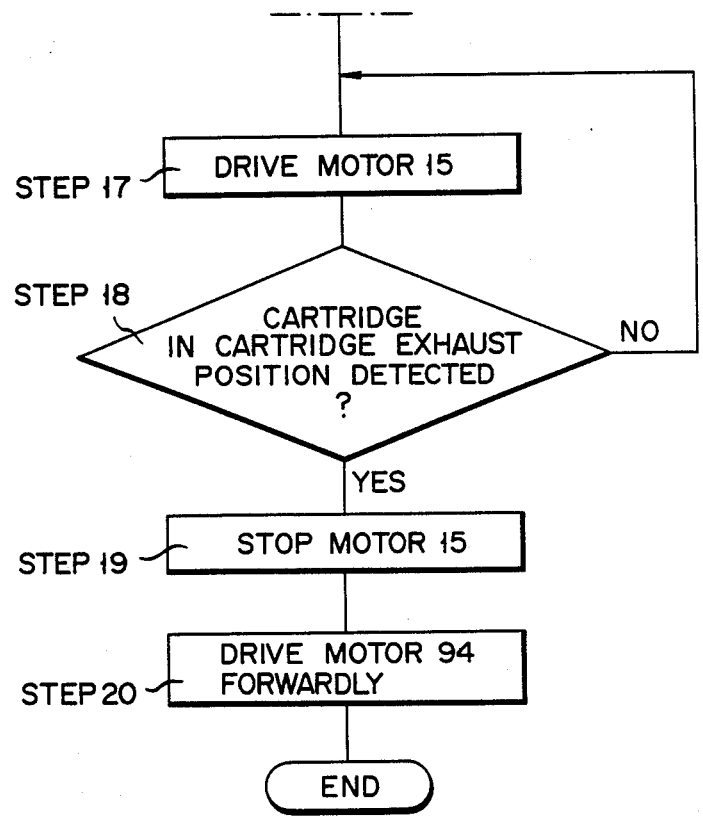

Excluding this, the operation of the second embodiment is similar to that of the first embodiment. More specifically, referring to the block diagram of FIG. 13, when valve 55 drive VDI is replaced by the drive of valve 73, SOL II 55 is replaced by the solenoid of valve 73, drive VD II is replaced by the drive of valve 74, and SOL III 56 is replaced by the solenoid of valve 74, and when steps 11 and 12 in flow charts of FIGS. 14A and 14C are executed simultaneously, the operation of the second embodiment is obtained.

Figure 6:
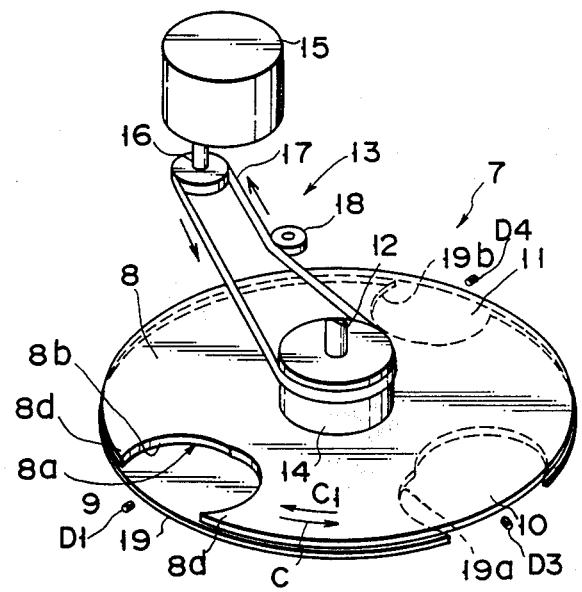
FIG. 6 is a perspective view of a main portion of a dispenser according to another embodiment of the present invention.

In the embodiment shown in FIG. 1, rotary disc 8 of cartridge moving mechanism 7 is rotated in one direction, and a plurality of cartridge holding portions 8a are provided at equal intervals on the periphery of disc 8 in its circumferential direction. However, as shown in FIG. 6, rotary disc 8 having a single cartridge holding portion 8a can be provided to be rotatable in the forward/reverse directions indicated by arrows C and C'. In this case, after cartridge 1 is received at cartridge receiving position 9 immediately under hopper 22, disc 8 is moved in the direction of arrow C until its cartridge holding portion 8a reaches extracting position 10. Disc 8 is then temporarily stopped, and coffee extraction is performed. Then, disc 8 is moved again in the direction of arrow C to shift its holding portion 8a to cartridge exhaust position 11. Disc 8 is then temporarily stopped, and used cartridge 1 is released. Subsequently, disc 8 is rotated in the direction indicated by arrow C1, which is opposite to the direction indicated by arrow C, and stopped. A coffee extracting cycle is also be performed every time this forward/reverse rotation is intermittently performed.

In this case, cartridge support disc 19 below rotary disc 8 has notches 19a and 19b at its portions corresponding to extracting position 10 and cartridge exhaust position 11 in a manner similar to that of FIG. 1.

In this embodiment, only a single hopper is used, and rotary disc 8 is rotated in the forward/reverse direction. Excluding these, the arrangement and operation of this embodiment are the same as those of FIG. 1.

Figure 15:
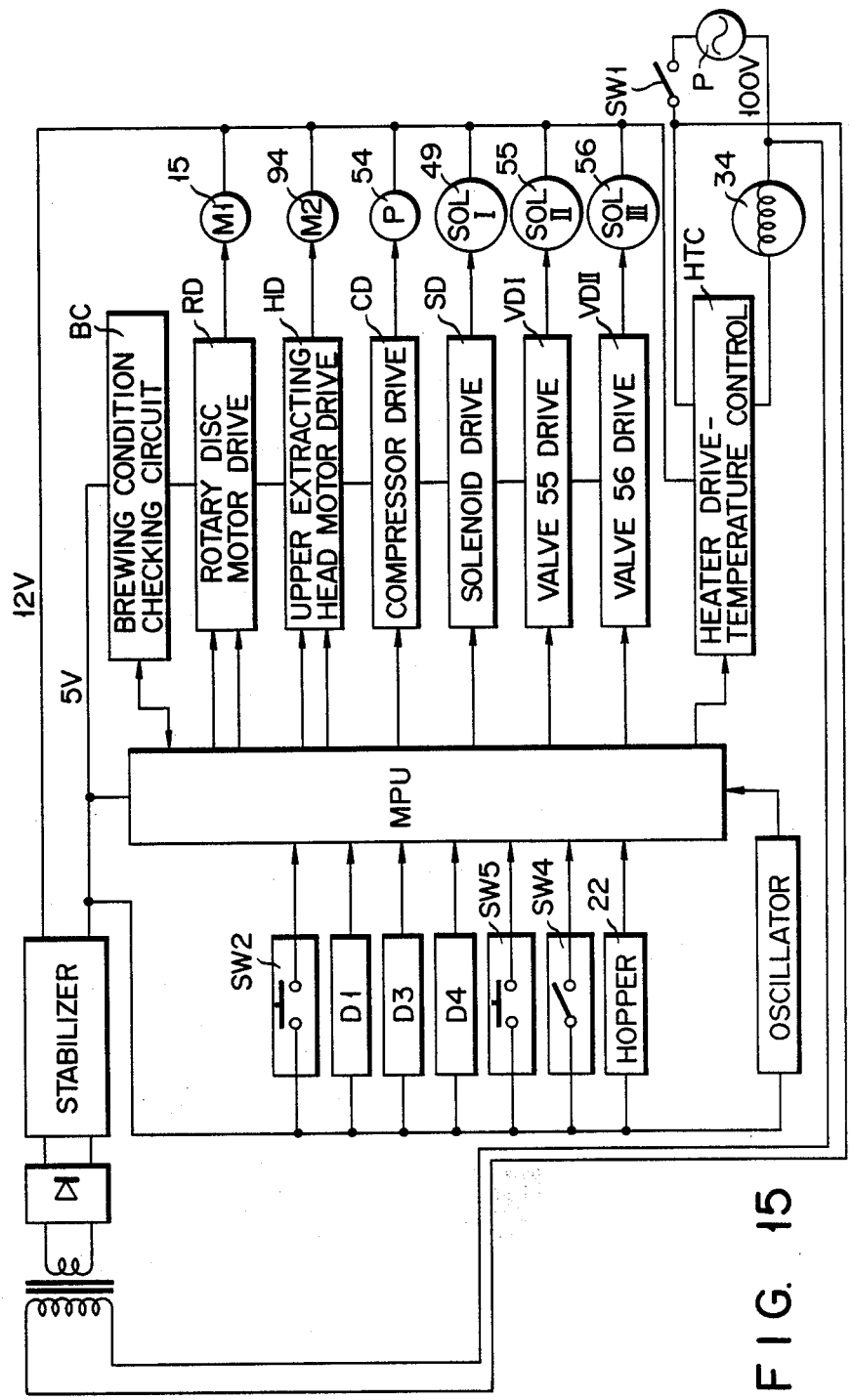
FIG. 15 is a block diagram of the embodiment shown in FIGS. 6 and 12.

When the hydraulic circuit shown in FIG. 1 is applied to this embodiment, a block diagram as shown in FIG. 15 is obtained. In FIG. 15, switch SW2 and detector D2 are omitted and only single hopper 2 is used. Excluding these, the block diagram of FIG. 15 is the same as that of FIG. 13.

Figure 16B:
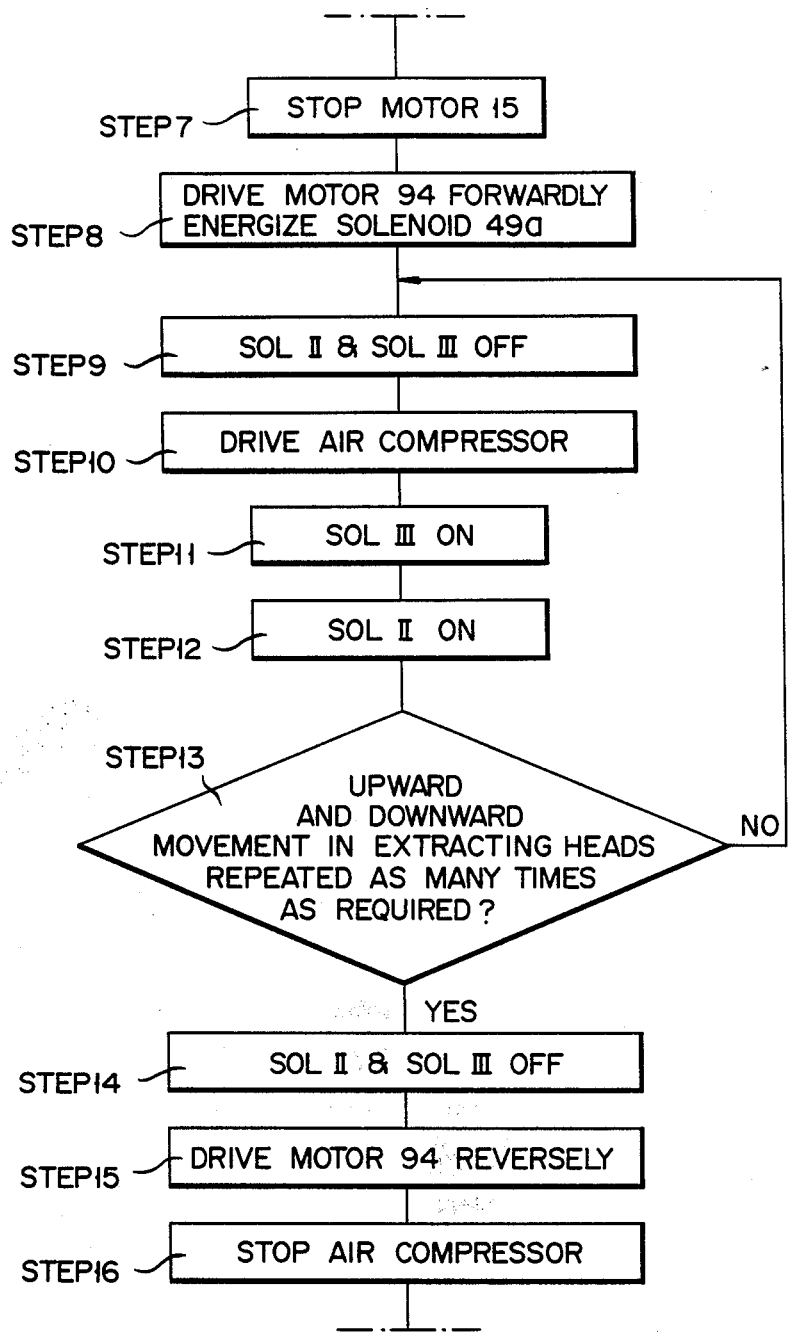
Figure 16C:
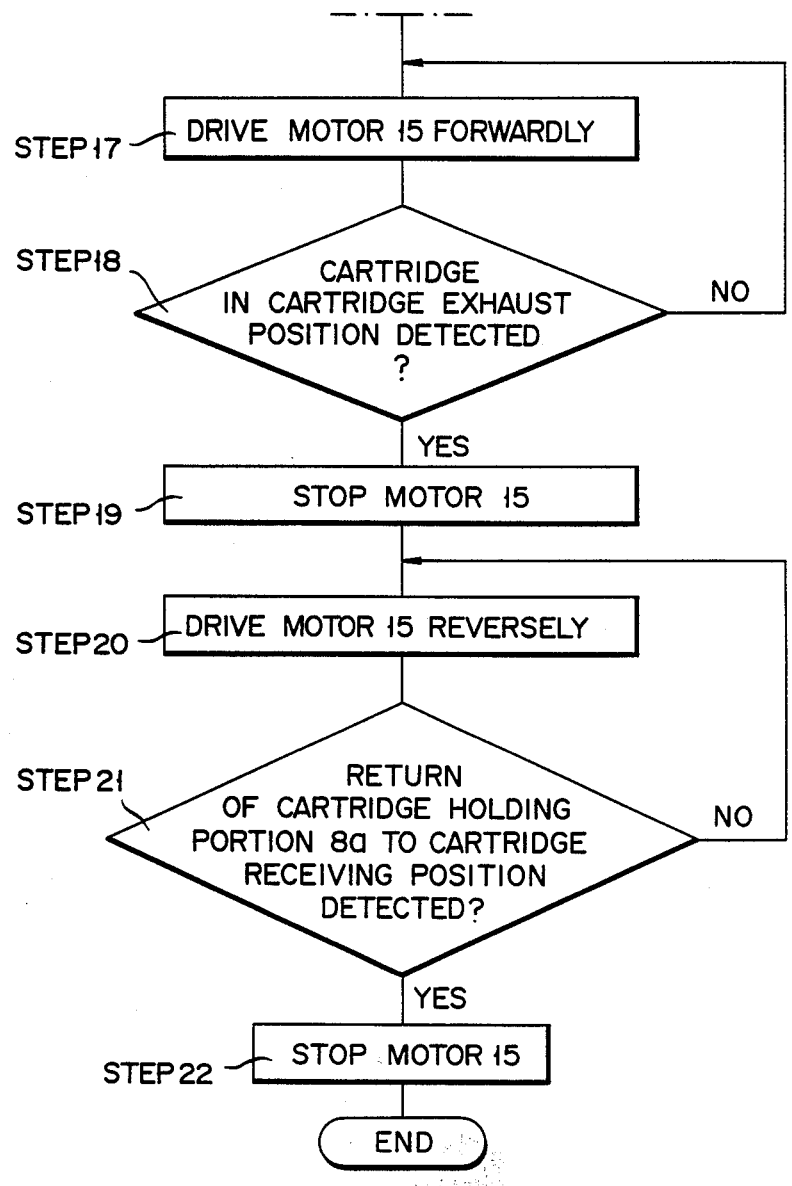

FIGS. 16A to 16C are the flow chart of this embodiment. Excluding addition of steps 20 and 21, the flow chart of FIGS. 16A to 16C are the same as those of FIGS. 14A to 14C.

The hydraulic circuit in FIG. 12 can naturally be applied to this embodiment.

In the embodiments shown in FIGS. 1 and 6, the positions of flow-in cylinder 32 and communication hole 33 provided in lower extracting head 25 can be interchanged.

A case will be described with reference to FIGS. 17 to 23 wherein hoppers having cartridges containing different types of coffee are used and can be exchanged by a user as required in accordance with his preference. In this embodiment the tern, "a cartridge stacking case" is used in place of a hopper.

Figures 17, 18:
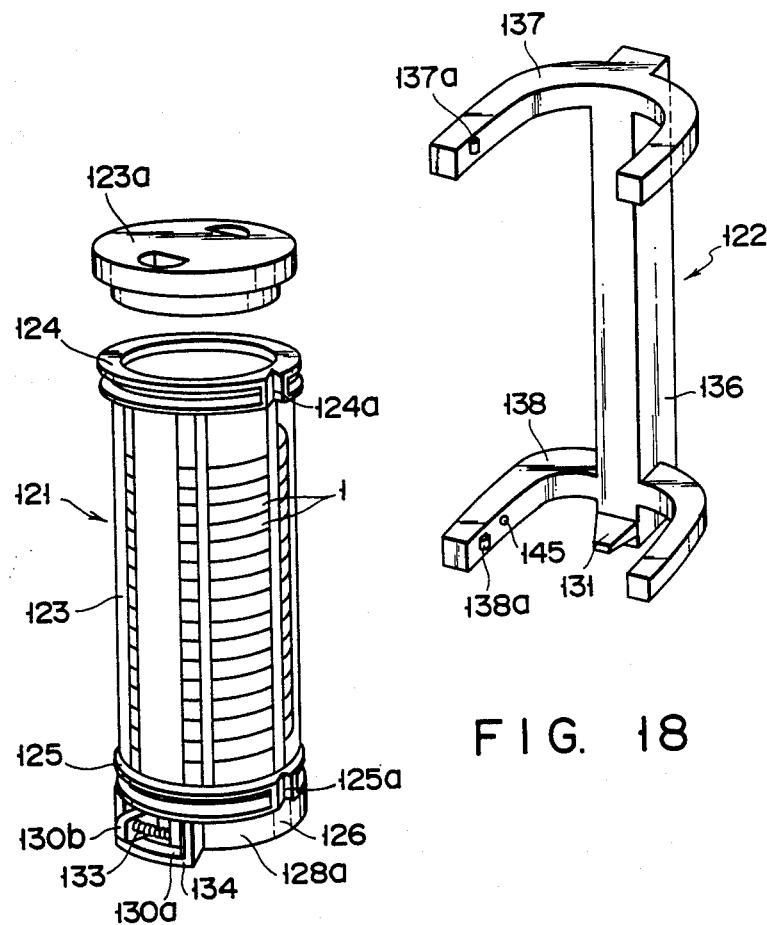
FIG. 17 is a perspective view of a case body of another embodiment of a hopper.
FIG. 18 is a perspective view of a case receiving member for receiving a case body.
Figure 19:
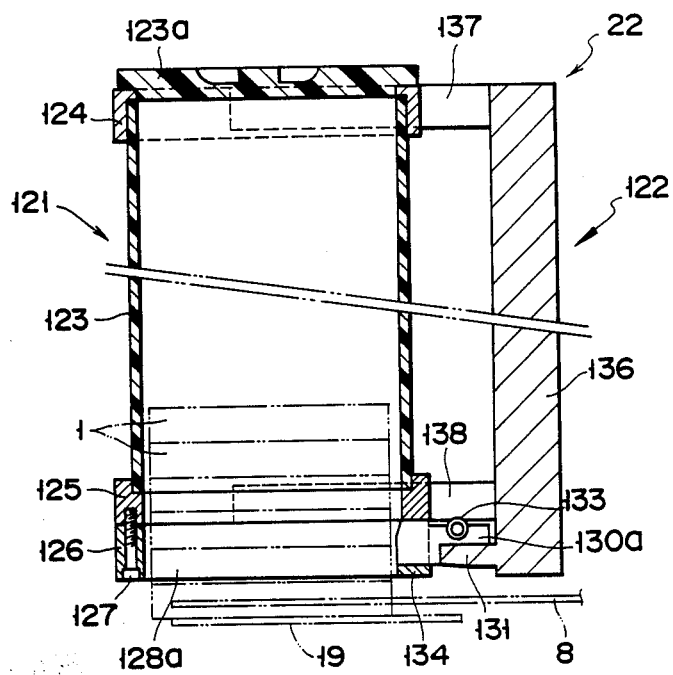
FIG. 19 is a longitudinal sectional view of a hopper in a state wherein the case body shown in FIG. 17 is received by the case receiving member shown in FIG. 18.

FIG. 17 shows case body 121 of cartridge stacking case 22, and FIG. 18 shows case receiving member 122 detachably mounting case body 121 thereon and fixed on the casing frame of the dispenser. Case receiving member 122 is provided immediately above extracting unit 10 shown in FIG. 1. FIG. 19 shows a state wherein main body 121 is mounted on case receiving member 122.

Cartridge stacking case 121 has, as a main body, hollow cylindrical member 123 made of a transparent plastic or the like and having such an inner diameter and a height that allow storage of, e.g., ten cartridges. Rings 124 and 125 having the same diameters are fixed on the upper and lower ends of the outer surface of cylindrical member 123. Pairs of recesses 124a and 125a are formed on corresponding rings 124 and 125. The recesses of each pair are separated from each other in the direction of the diameter of the corresponding ring. The upper end of cylindrical member 123 is closed with lid 123a.

Base portion 126a of substantially horse-shoe-shaped cartridge holding member 126, a portion of which is opened, is fixed with fixing bolt 127 on the lower end of ring 125 fixed to the lower end of hollow cylindrical member 123. Holding member 126 externally holds cartridge 1 by its elastic deformation. The main part of holding member 126 comprises a pair of holding arms 128a and 128b. Engaging portions 130a and 130b are formed on the distal ends of arms 128a and 128b, respectively. Engaging portions 130a and 130b have engaging surfaces 129a and 129b engageable with trapezoidal wedge 131 provided on the lower inner end of case receiving member 122. Engaging surfaces 129a and 129b are arranged such that a gap 133 between them is enlarged in the outer radial direction of cartridge holding member 126. Tension coil spring 133 is stretched between engaging portions 130a and 130b. Coil spring 133 draws holding arms 128a and 128b close to each other to clamp and hold lowest cartridge 1 from outside. At the same time, all the cartridges 1 stacked above the lowest one are supported by the clamping force. When no cartridge 1 is in case main body 121, holding arms 128a and 128b are closer to each other such that their inner surfaces are located inside the inner surface of hollow cylindrical member 123. Therefore, when cartridge 1 is to be supplied into case 121, arms 128a and 128b serve as a stop to support the lower surface of the outer portion of cartridge 1.

Figure 20:
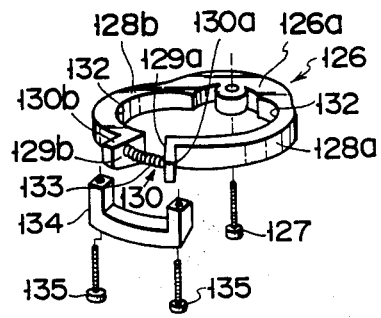
FIG. 20 is an exploded perspective view of a cartridge holding portion of the case body shown in FIG. 17.

Therefore, when holding arms 128a and 128b are opened against the biasing force of coil spring 133, the holding force on cartridge 1 is released and cartridge 1 can be dropped. As shown in FIGS. 17 and 20, substantially U-shaped stop member 134 is fixed on the lower surface of ring 125 with bolt 135 to prevent cartridge holding arms 128a and 128b from being excessively enlarged. Irregular portions are formed on the inner surfaces of arms 128a and 128b, or an elastic member such as a rubber is adhered on the outer surfaces of arms 128a and 128b, in order to increase the frictional force with the outer surface of cartridge 1.

Case receiving member 122 has substantially U-shaped support arms 137 and 138 projecting forward at upper and lower ends of support column 136, as shown in FIGS. 18 and 19. Projections or preferably balls 137a and 137b are provided in the inner surfaces of support arms 137 and 138 to be engaged with recesses 124a and 125a on the outer surfaces of rings 124 and 125 fixed on the upper and lower ends of hollow cylindrical member 123. These projections or balls 137a and 138a elastically project by the operation of incorporated coil springs to correctly position case body 121. Optical sensor 145 is provided to lower support arm 138 to detect whether case body 121 is mounted on case receiving member 122. When case main body 121 is not mounted, extracting mechanism 20 is not started.

Figure 21:
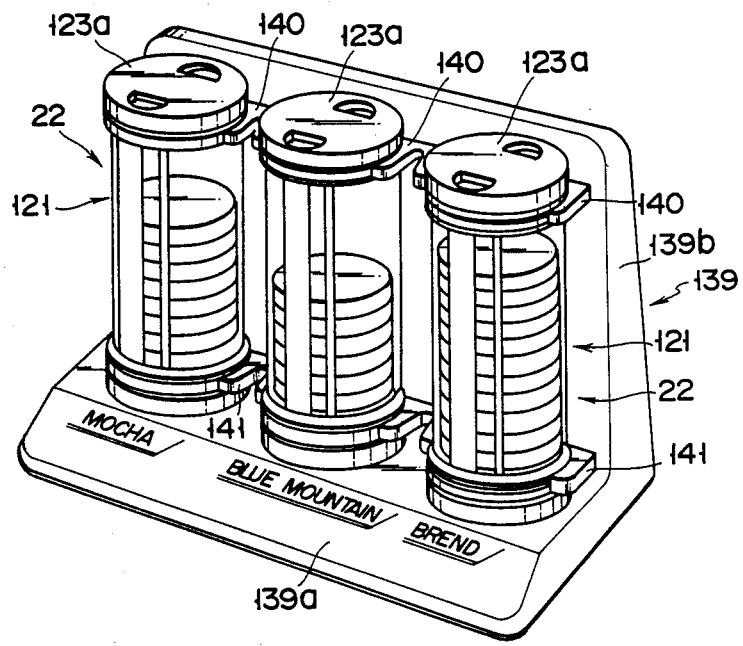
FIG. 21 is a perspective view of an embodiment of a hopper rack which holds the case bodies of FIGS. 17 and 18.

FIG. 21 shows an embodiment of rack 139 for holding three types of cartridge stacking cases 121. Stacking cases 121 store cartridges 1 filled with three different types of coffee. Rack 139 comprises base portion 139a and rear wall portion 139b. The type of coffee is indicated on the front surface of base portion 139a, as shown in FIG. 21. Support arms 140 and 141 similar to support arms 137 and 139, respectively, are provided to rear wall portion 139b to prevent case body 121 from falling. Wedges (not shown) each similar to trapezordal wedge 131 provided to case receiving member 122 are provided at predetermined positions of the lower portion of rear wall portion 139b.

The operation of this embodiment will be described. Lid 123a is removed and a predetermined number of cartridges 1 are charged in case bodies 121. Then, lid 123a is closed and case bodies 121 are supported on rack 139, lid 123a. As a result, cartridges 1 are kept clean.

When case body 121 is to be mounted on case receiving member 122 in the dispenser, it is first pulled in the forward direction to be removed from rack 139. In this case, although not shown in FIG. 21, projections similar to projections 137a and 138a of arms 137 and 138 of case receiving member 122 are retractably provided to support arms 140 and 141. Therefore, when case body 121 is pulled in the forward direction, the projections are temporarily retracted in the inner surfaces of support arms 140 and 141, and case body 121 can be easily removed. Subsequently, case body 121 removed from rack 139 is inserted in case receiving member 122 from the front side thereof. In this case, projections 137a and 138a are temporarily retracted in the same manner. When case body 121 is mounted in the regular state, projections 137a and 138a are elastically engaged with recesses 124a and 125a in case body 121. Meanwhile, holding arms 128a and 128b of cartridge holding member 126 are urged outward by corresponding engaging portions 130a and 130b against the biasing force of coil spring 133. Thus, lowest cartridge 1 in case main body 121 is released from arms 128a and 128b and disposed on rotary disc 8 shown in FIGS. 1, 2, and 21.

Holding arms 128a and 128b are maintained in the open state by wedge 131 until case body 121 is removed from case receiving member 122, and thus cartridge 1 in main body 121 is not clamped by arms 128a and 128b. Therefore, when cartridge 1 drops in cartridge holding portion 8a of rotary disc 8, disposed on cartridge support disc 19 at cartridge receiving position 9, and moved toward extracting position 10, next cartridge 1 is disposed on rotary disc 8. In this state, arms 128a and 128b facing the outer surface of corresponding cartridge 1. Therefore, when case body 121 is to be replaced by another case body 121, used case body 121 is pulled forwardly from case receiving member 122. Then, engaging portions 130a and 130b of holding arms 128a and 128b are released from wedge 131, and arms 128a and 128b are urged to each other by the biasing force of coil spring 133 to narrow the gap 133 between them, thereby holding new lowest cartridge 1. Therefore, new cartridge 1 does not fall.

In coffee extraction, when new case body 121 has been mounted on case receiving member 122, it is detected by optical sensor 145, and extracting mechanism 20, as shown in FIGS. 7 and 8, is started.

Figure 22:
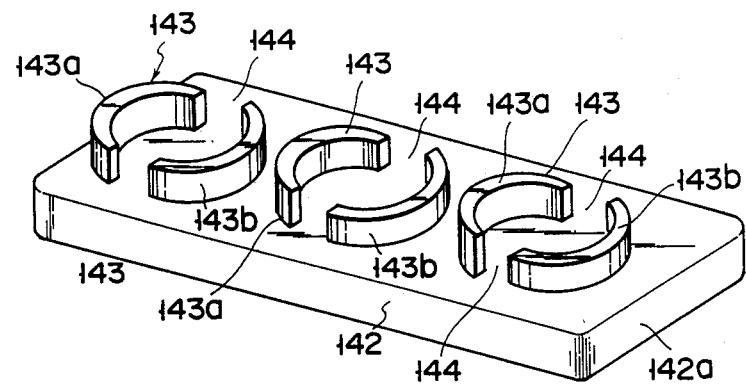
FIG. 22 is a perspective view of another embodiment of a hopper rack.

FIG. 22 shows another embodiment of the rack. Rack 142 comprises flat base 142a and holding cylinders 143 provided on the upper surface of base 142a. A plurality of pairs of semicircular members 143a and 143b having an inner diameter larger than the outer diameter of ring 125 of case body 121 are fixed on the upper surface of base 142a to face each other, thereby constituting holding cylinders 143. Gaps 144 of each pair of semicircular members 143a and 143b serve to be engaged with engaging portions 130a and 130b projecting from holding arms 128a and 128b of case body 121. Rack 142 is merely used to hold case body 121 thereon. However, with rack 142, the entire manufacturing cost can be greatly reduced.

Figure 23:
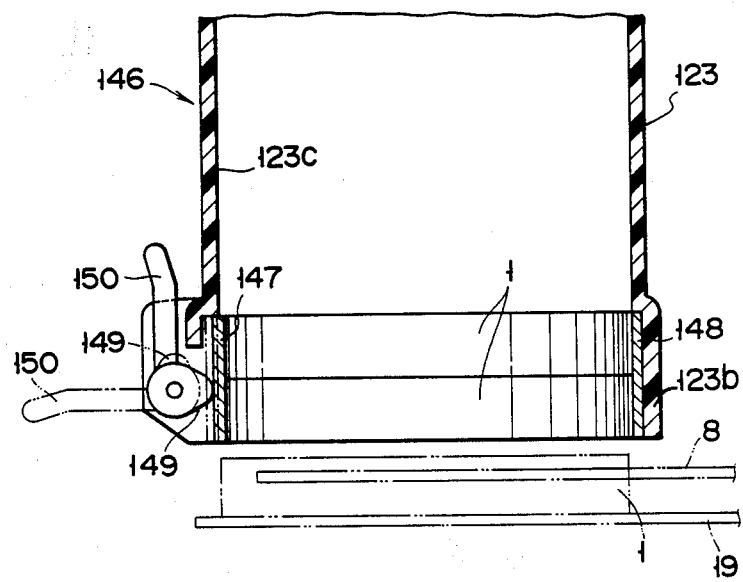
FIG. 23 is a longitudinal sectional view of another embodiment of a hopper.

FIG. 23 shows an embodiment of a hopper, i.e., stacking case.

The inner diameter of lower portion 123b of hollow cylindrical member 123 is larger than the remaining portion for a range corresponding to the thickness of two cartridges or more, and two arcuated cartridge holding pieces 147 and 148 made of hard rubber are provided to be symmetrical with each other with respect to the central axis of cylindrical member 123, thereby constituting case body 146. Holding piece 148 on the rear side of case body 146 is fixed on the inner surface of cylindrical member 123 so that its inner surface is an extended surface of cylindrical body 123. Holding piece 147 on the front side of case body 146 is movable towards the central axis of cylindrical member 123 and in a direction opposite it.

Movable cartridge holding piece 147 is pulled by a tension coil spring (not shown) in a direction to separate from the central axis of hollow cylindrical body 123. In the released state, the inner surface of holding piece 147 is at a backward position not to serve as the extended surface of inner surface 123c of cylindrical body 123. On the other hand, when holding piece 147 holds the outer surface of cartridge 1, the inner surface of holding piece 147 is urged toward the central axis of cylindrical body 123 by eccentric cam 149 provided to the lower front portion of cylindrical body 123. As a result, holding piece 147 projects to a position in inner surface 123c of cylindrical body 123 to press the outer surface of cartridge 1 and to hold cartridge 1 together with rear-side holding piece 148. Eccentric cam 149 is pivoted to cylindrical body 123 and is rotated by cam lever 150 fixed to cam 149. When lever 150 is set upright as indicated by the solid line in FIG. 23, cam 149 urges holding piece 147 to the right to hold cartridge 1. When lever 150 is turned as indicated by the two-dotted line in FIG. 23, holding piece 147 releases cartridge 1.

Cartridge holding pieces 147 and 148 can be manually operated by cam lever 150. Therefore, stored cartridge 1 can be reliably clamped and released.

When the hopper, i.e., cartridge stacking case 22 in FIGS. 17 to 23 is mounted on case receiving member 122, cartridge 1 drops and is received by cartridge holding portion 8a. Therefore, the block diagram of this case is obtained by omitting switch SW1 in FIG. 15, and the resultant dispenser operates in accordance with a flow chart obtained by replacing step 1 for step 4 in FIGS. 16A to 16C, thus omitting step 4 in FIG. 16A. The embodiment shown in FIG. 12 can also be applied to this embodiment.

A coffee dispenser having another embodiment of a cartridge moving mechanism will be described with reference to FIGS. 24 to 30. In this case, the coffee dispenser is called an extracting system.

FIG. 24 schematically shows the entire arrangement of extracting system (coffee dispenser) 201. When a press button on operation panel 202 provided on the front surface of extracting system 201 is depressed, extracting system 201 is started and, e.g., coffee is extracted within about a minute, supplied through outlet port 203, and poured into cup 204.

In this embodiment, cartridge moving mechanism 25 is provided on the right side of the front portion of extracting system 201.

Moving mechanism 205 has substantially fan-shaped flat tray 206, as shown in FIGS. 25 to 28. Circular hole-shaped cartridge receiving portion 213 is formed at the central portion of tray 206, and pawl levers 222 to be described later are provided on plate 206 so as to be projectable into and retractable from cartridge storing portion 213. Vertical shaft 209 provided on bracket 208 fixed onto frame 207 of extracting system 201 is fitted in hole 210 formed in pivot 206a of tray 206 such that tray 206 can be swung in the horizontal direction about shaft 209. Tray 206 swings back and forth in a horizontal plane between a cartridge supply position within extracting system 201 as indicated by the solid line in FIG. 25 and a cartridge receiving position as indicated by the two-dotted line in FIG. 25. Knob 211 is provided on tray 206 to manually and freely move it between the two positions. Outer peripheral surface 206b of tray 206 is formed such that it does not impair the appearance of extracting system 201 when tray 206 is positioned in the cartridge supply position.

Cartridge holding portion 213 at substantially the central portion of tray 206 has an inner diameter larger than the outer diameter of flat, circular source material cartridge (similar to that shown in FIGS. 3 and 4; to be referred to as "cartridge" hereinafter) 1 shown in FIG. 26. For easy understanding, the bottom plane of cartridge moving mechanism 205 is shown in FIG. 27.

Annular groove 217 is formed on the underface of tray 206 so as to surround cartridge holding portion 213, as shown in FIG. 27, and flat ring 218 is provided within groove 217 to slide in both circumferential directions of groove 217. Ring 218 is horizontally supported by a plurality of (three in this embodiment) support plates 219 fixed on tray 206 by screws 220 such that it does not drop into annular groove 217. Support pins 221 project downward from the lower surface of ring 218 and are arranged to be equidistantly spaced from each other in the circumferential direction. Pawl levers 222 are supported at their base end portions 222a by pawl levers 222 so as to be horizontally swung therearound. When pawl levers 222 are located in cartridge holding portion 213, they support the lower surface of cartridge 1 in holding portion 213. Those three portions of lateral wall 217a of annular groove 217, which are equidistantly spaced from each other in the circumferential direction, are cut away to form windows 223. Through windows 223, pawl levers 222 swing between a holding position indicated by the solid line in FIG. 28 where they project into cartridge holding portion 213, and a release position indicated by the broken line in FIG. 28 where they are retracted from cartridge holding portion 213.

Pawl levers 222 are driven simultaneously by pawl lever drive mechanism 224 (FIGS. 28 and 29) to be described below. More specifically, each pawl lever 222 is always elastically urged by torsion spring 225 (FIG. 26) loosely wound around support pin 221 in the direction in which the free end of each lever 222 projects into cartridge holding portion 213. Base portion 222a of each pawl lever 222 is formed narrow, and free end 222c of pawl lever 222 alternately projects into and is retracted from storing portion 213 through window 223 formed in lateral wall 217a of annular groove 217. When ring 218 is rotated counterclockwise in FIG. 28 by moving knob 211 counterclockwise, narrow base portion 222a of each pawl lever 222 is urged against the upstream ridge of window 223. Base portion 222a is pivoted counterclockwise in FIG. 28 against the biasing force of torsion spring 225, and reaches the release position indicated by the broken line.

Figure 28:
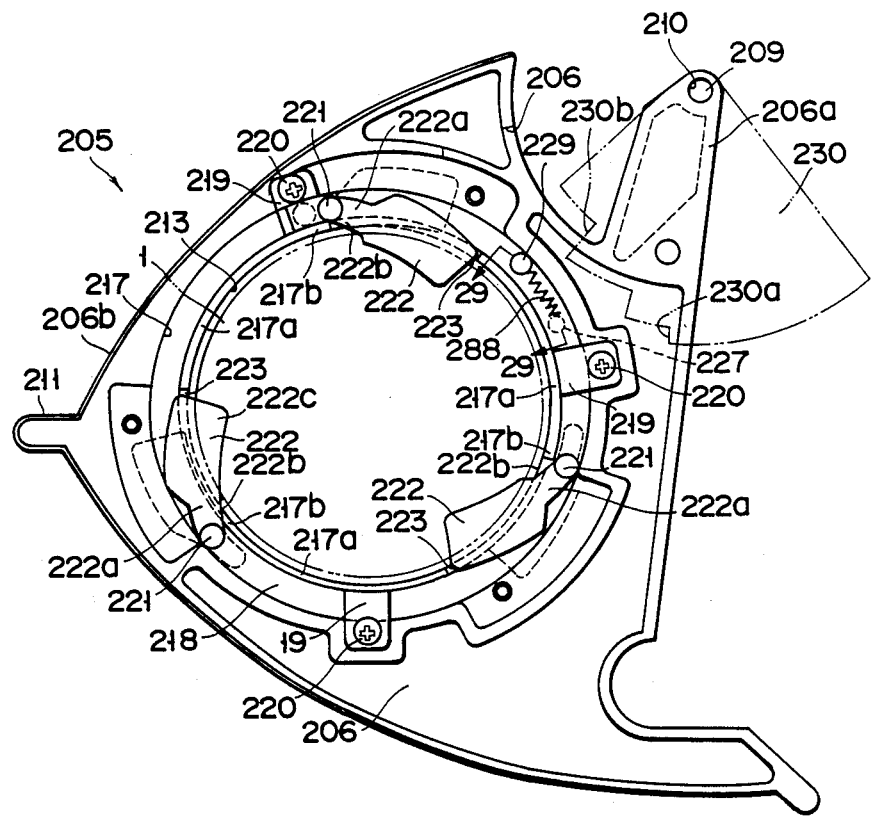
FIG. 28 is a bottom view of the moving mechanism shown in FIG. 25.
Figure 29:
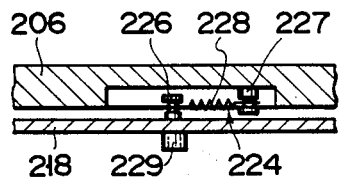
FIG. 29 is a sectional view taken along the line 29—29 of FIG. 28.

Tension spring 228 is stretched between pin 226 upwardly projected from ring 218 and pin 227 downwardly projecting from tray 206, as shown in FIG. 29, so that ring 218 is biased to rotate clockwise in FIG. 28 by the biasing force of tension spring 228. Free end 222c of each pawl lever 222 is thus pivoted to a holding position in cartridge holding portion 213.

Pin 229 projects from the lower surface of ring 218 to face step 230a formed on the periphery of operation plate 230 fixed in extracting system 201. When tray 206 is moved into extracting system 201, pin 229 is urged counterclockwise in FIG. 28 by step 230a of plate 230. When tray 206 is urged into extracting system 201, another step 230b on plate 230 is abutted against step 206c provided at an appropriate position of tray 206, so that tray 206 is no longer pivoted clockwise in FIG. 28.

When tray 206 is completely pressed into extracting system 201 and reaches the cartridge supply position, pin 229 is urged by operation plate 230. Therefore, ring 218 is pivoted to reach an operation position against the biasing force of tension spring 228, and pawl levers 222 are retracted from cartridge holding portion 213 into tray 206 as indicated by the dotted line in FIG. 28. In this case, cartridge 1 drops onto a cartridge convey disc (not shown in FIG. 28; e.g., a disc similar to the rotary disc of FIG. 6) of extracting system 201 by its weight while it is maintained in the horizontal state.

A click mechanism comprising compression spring 231, ball 232 and positioning hole 233 is provided between tray 206 and operation plate 230, as shown in FIG. 26, to correctly position tray 206 in extracting system 201 at the cartridge receiving position.

The operation of this embodiment will be described.

The consumer selects source material cartridge 1 in accordance with his preference and operates knob 211 to horizontally pivot tray 206 from the cartridge receiving position, indicated by the solid line in FIG. 25, to that cartridge receiving position outside extracting system 201 which is indicated by the two-dotted line in FIG. 25. Since tension spring 228 between tray 206 and ring 218 is pulled as tray 206 is pivoted, ring 218 is gradually rotated clockwise in FIG. 28 by the biasing force of spring 228, and energy is accumulated in spring 228. As tray 206 is pivoted, pawl levers 222 mounted on ring 218 are gradually moved to project into cartridge holding portion 213 from windows 223 by the biasing force that pivots them about support pins 22 of torsion springs 225 (FIG. 26). The positional relationship between pawl levers 222 and windows 223 is thus gradually changed. At last, pawl levers 222 take the maximum projection state as indicated by the solid line in FIG. 26 at the cartridge receiving position. Tray 206 is kept at the cartridge receiving position when ball 232 of the click mechanism is engaged with positioning hole 233.

Subsequently, when prepared cartridge 1 is set in cartridge holding portion 213 of tray 206, it is placed on projecting pawl levers 222 in storing portion 213 and supported by them in the horizontal state.

Subsequently, tray 206 storing cartridge 1 is pressed into extracting system 201 with knob 211. During the pressing operation, pin 229 projecting from the lower surface of ring 218 urges step 230a of operation plate 230. Flat ring 218 is drawn against the biasing force of tension spring 228 and is rotated counterclockwise in FIG. 28.

Then, when cartridge holding portion 213 of tray 206 reaches a position immediately under the cartridge supply position, pawl levers 222 are drawn into tray 206 from cartridge holding portion 213 all at once. As a result, cartridge 1 placed on pawl levers 222 is no longer supported and dropped by its weight while it is maintained in the horizontal state. The drop distance of cartridge 1 is slightly larger than the thickness of cartridge 1, and cartridge 1 is dropped onto the cartridge convey disc (not shown) of extracting system 201 almost instantaneously.

In this case, when ball 232 of the click mechanism is elastically engaged with another positioning hole 233, tray 206 is held into extracting system 201, thereby preventing tray 206 from moving outside extracting system 203.

Then, extraction is performed by extracting system 210. For example, a cup of desired type of coffee is extracted and poured into cup 204 through outlet port 203. After coffee is poured, tray 206 is removed from extracting system 201 to remove used cartridge 1. Then, tray 206 is returned in extracting system 201.

When another type of coffee is to be extracted, a cartridge containing the corresponding coffee may be selected, and operation can be performed in a similar manner to that described above.

Figure 30:
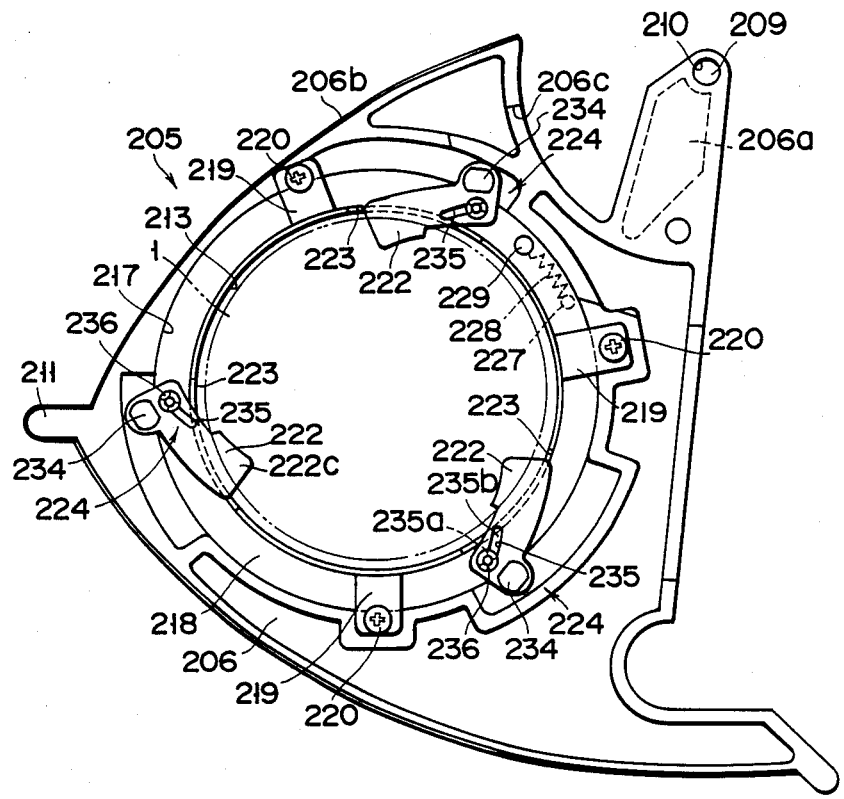
FIG. 30 is a bottom view of another embodiment of a moving mechanism applied to the dispenser shown in FIG. 24

FIG. 30 shows still another embodiment of the cartridge moving mechanism.

In this embodiment, the drive method for pawl levers 222 of the embodiment shown in FIGS. 25 to 29 is altered. More specifically, the base portions of three pawl levers 222 are pivoted to support pins 234 provided on tray 206. Arcuated, elongated cam hole 235 is formed in each pawl lever 222. Pin 236 projecting from the lower surface of ring 218 is engaged with cam hole 235. Except these points, the arrangement of FIG. 30 is the same as that of FIGS. 25 to 29.

In this embodiment, when ring 218 is pivoted counterclockwise in FIG. 30 by the biasing force of tension spring 228, pins 236 on flat ring 218 are engaged with bases 235a of elongated cam holes 235 of corresponding pawl levers 222, and free ends 222c of pawl levers 222 are moved to project to reach the operation position in cartridge storing position 213 (indicated by the solid line in FIG. 30). When pins 229 provided on ring 218 are urged by operation plate 230, pins 236 on ring 218 is rotated clockwise in FIG. 30 to move towards the distal end 235b of cam holes 235. Thus, free ends 222c of pawl levers 222 are retracted from cartridge storing portion 213, and cartridge 1 is allowed to drop.

What is claimed is:
1. A dispenser comprising:

a cartridge moving mechanism for moving between a cartridge receiving position and an extracting position, and between said extracting position and a cartridge exhaust position provided within a horizontal plane;

a hopper arranged immediately above said cartridge receiving position and having a dropping unit for dropping a cartridge, said cartridge comprising a liquid-impermeable outer frame and a filter provided in said outer frame and containing a powdery or granular material; and an extracting mechanism comprising an upper extracting head provided above said extracting position and having a first extracting chamber, and a lower extracting head having an extracting tank provided below said extracting position so as to face said upper extracting head and having a second extracting chamber formed therein, a heating unit for heating said extracting tank and liquid heating passage means communicating with said second extracting chamber.

2. A dispenser according to claim 1, further comprising drive means for sequentially moving said cartridge moving mechanism from said cartridge receiving position to the extracting position and then to the cartridge exhaust position, and for stopping said cartridge moving mechanism at said cartridge receiving position, said extracting position and said cartridge exhaust position for a predetermined period of time.

3. A dispenser according to claim 2, further comprising opening/closing means for approaching said upper and lower extracting heads to each other and separating the same from each other such that, when said upper and lower extracting heads approach each other, said upper and lower extracting heads clamp said cartridge which has been conveyed to said extracting position.

4. A dispenser according to claim 3, further comprising a liquid metering mechanism connected to said liquid heating passage means of said lower extracting head for metering and storing a predetermine amount of a liquid.

5. A dispenser according to claim 4, wherein said liquid heating passage means comprises a passage surrounding said second extracting chamber, said passage having one end connected to said liquid metering mechanism and the other end communicating with said second extracting chamber.

6. A dispenser according to claim 5, wherein said liquid heating passage means is a spiral flow passage.

7. A dispenser according to claim 5, wherein an said extracting tank of said lower extracting head has an outer peripheral wall comprising heating fin means, and said heating passage means is formed in said heating fin means.

8. A dispenser according to claim 7, wherein said heating fin means comprises a spiral fin, and said heating passage means comprises a spiral flow passage formed in and along said fin.

9. A dispenser according to claim 4, comprising a first valve connected to said first extracting chamber and said extracting tank for selectively connecting said first extracting chamber and said extracting tank with and disconnecting the same from the atmosphere, and a second valve connected to a pressurized gas source and cooperating with said first valve for selectively supplying a liquid in said liquid metering mechanism to said fluid heating passage means, a pressurized gas from said pressurized gas source to said fluid heating passage means and a pressurized gas from said pressurized gas source to an interior of said first extracting chamber.

10. A dispenser according to claim 9, wherein said second valve comprises a first forced drive three-way valve having an inlet port connected to said pressurized gas source, a first outlet port and a second outlet port, and a second forced drive three-way valve having an inlet port connected to said first outlet port of said first forced drive three-way valve, a third outlet port and a fourth outlet port connected to said liquid heating passage means; and said first valve comprises a first balance three-way valve having an inlet port connected to said second outlet port, a first inlet/outlet port communicating with said first extracting chamber of said upper extracting head, and a fifth outlet port communicating with the atmosphere, and a second balance three-way valve having an inlet port connected to said third outlet port, a second inlet/outlet port connected to said liquid heating passage means, and a sixth outlet port connected to the atmosphere.

11. A dispenser according to claim 9, wherein said first valve comprises a first forced drive three-way valve having an inlet port connected to said pressurized gas source, a first outlet port connected to said liquid metering mechanism, and a second outlet port connected to said first extracting chamber, and said second valve comprises a second forced drive three-way valve having a first inlet/outlet port connected to said first extracting chamber, a second inlet/outlet port connected to said liquid metering mechanism, and a second outlet port selectively connected to said first and second inlet/outlet ports and is thus connected to the atmosphere.

12. A dispenser according to claim 3, wherein said lower extracting head comprises an exhaust port formed in a bottom of said second extracting chamber of said extracting tank, valve means provided in said second extracting chamber and urged by said upper extracting head to close said exhaust port when said upper and lower extracting heads approach each other, and biasing means for normally biasing said valve means so as to separate said valve means from said exhaust port.

13. A dispenser according to claim 12, wherein said valve means comprises a valve portion urged against said exhaust port to close said exhaust port, an inverted frustoconical-shaped funnel portion extending from said valve portion toward said upper extracting head in said second extracting chamber and having an interior communicating with said second extracting chamber through a communication hole formed in a lateral side thereof, and a flexible flange portion formed on an upper end of said funnel portion to surround said funnel portion and fixed to an upper end of said upper extracting head.

14. A dispenser according to claim 1, wherein said cartridge moving mechanism has a horizontal rotary disc having notches at said extracting position and said cartridge exhaust position, and a rotary disc coaxially supported on said fixed horizontal cartridge support disc and having notch-like cartridge holding portions for receiving said cartridge from said hopper.

15. A dispenser according to claim 14, wherein said cartridge has a circular shape, and said cartridge holding portion comprises a seizing portion having a semicircular shape directed in one circumferential direction of said horizontal rotary disc, a guiding portion having a semi-circular shape directed in the other circumferential direction of said horizontal rotary disc and separated from said seizing portion in said other circumferential direction, and retaining portions having a substantially triangular shape defined by an outer periphery of said horizontal rotary disc and outer portions of said seizing portion and said guiding portions, said seizing portion and said guiding portion being complementary to said cartridge.

16. A dispenser according to claim 15, wherein said cartridge holding portion are arranged circumferentially equidistantly in said horizontal rotary disc; and said hopper, said extracting position and said cartridge exhaust position are vertically aligned with a corresponding cartridge holding portions when one of said cartridge holding portions is located immediately under said hopper.

17. A dispenser according to claim 1, wherein said cartridge moving mechanism comprises:

a tray which is horizontally swingable between said cartridge exhaust position and said extracting position and has a hollow cartridge holding portion formed at a central portion thereof;

a ring which surrounds said cartridge holding portion so as to be rotatable in opposite circumferential directions of said ring and is provided with not less than three windows separated from each other in the circumferential direction, each of said windows having two opposed ends in the circumferential direction;

pawl levers provided at the same intervals as those of said windows in the circumferential direction of said ring to surround said cartridge holding portion, said pawl levers being supported by said tray so as to be horizontally rotated;

biasing means for normally biasing said pawl levers toward said cartridge holding portion; and ring rotating means for rotating said ring such that said pawl levers are aligned with said corresponding windows when said tray is pivoted in said cartridge holding portion, such that said pawl levers are retracted from said cartridge holding portion by means of the respective ends of said corresponding windows when said tray is pivoted to locate said cartridge storing portion at said cartridge exhaust position.

18. A dispenser according to claim 17, wherein said ring rotating means comprises a vertical pin fixed to said ring, an operation plate having a step engaged with said vertical pin to urge said vertical pin when said tray is pivoted from said cartridge exhaust position to said extracting position, and biasing means provided between said tray and said ring for biasing said ring in a direction such that the corresponding ends of said windows normally cause said pawl levers to retract from said cartridge holding portion.

19. A dispenser according to claim 1, wherein said hopper comprises a case body and releasing means, said case body having a transparent hollow cylinder containing the stacked thin cartridges having the same size and cartridge holding means provided at a lower end of said cylindrical body for holding said cartridges in said cylindrical body, said releasing means comprising said dropping means for releasing said cartridge holding means from holding said cartridge.

20. A dispenser according to claim 19, wherein said cartridge holding means comprises an elastic annular member having a portion cut out so as to be normally contracted, and said releasing means is provided above the cartridge receiving position and having a wedge which is inserted in the cut-out portion of said annular member to drop said cartridge when said case wedge is inserted in said cut-out portion to open said annular member.

21. A dispenser according to claim 19, wherein said cylinder has a lower inner surface which is recessed deeper than an inner surface of a remaining portion, said cartridge holding means comprises at least one cartridge holding piece that can be projected in an interior of said cylinder, and said releasing means comprises an eccentric cam supported on said cylinder for urging said cartridge holding piece toward said interior of said cylinder or releasing said cartridge holding piece in accordance with rotation of said eccentric cam, and a cam lever connected to said eccentric cam for rotating the same.

* * * * *